(12) United States Patent
Ooshima et al.

(10) Patent No.: US 7,620,994 B2
(45) Date of Patent: Nov. 17, 2009

(54) DATA RECORDING SYSTEM AND DATA ACCESS METHOD

(75) Inventors: Hiroyoshi Ooshima, Yokohama (JP); Katsumi Iijima, Hachioji (JP); Yojiro Tagawa, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 11/238,611

(22) Filed: Sep. 29, 2005

(65) Prior Publication Data

US 2006/0080562 A1    Apr. 13, 2006

(30) Foreign Application Priority Data

Sep. 30, 2004   (JP) .............................. 2004-287651

(51) Int. Cl.
*G06F 7/00* (2006.01)
*G06F 12/14* (2006.01)
*G06F 12/16* (2006.01)
*G06F 13/00* (2006.01)

(52) U.S. Cl. ...................... 726/26; 711/100; 711/115; 711/164

(58) Field of Classification Search ................. 726/2, 726/16, 26, 27; 713/189, 193, 194; 711/100, 711/115, 154, 163, 164; 714/100, 1, 2
See application file for complete search history.

(56) References Cited

U.S. PATENT DOCUMENTS

| | | | | |
|---|---|---|---|---|
| 5,584,029 | A * | 12/1996 | Izui et al. | 713/300 |
| 6,154,819 | A * | 11/2000 | Larsen et al. | 711/163 |
| 7,103,909 | B1 * | 9/2006 | Kondo et al. | 726/2 |
| 7,216,235 | B1 * | 5/2007 | Platt | 713/182 |
| 2005/0132178 | A1 * | 6/2005 | Balasubramanian | 713/1 |

FOREIGN PATENT DOCUMENTS

JP    6-161863 A    6/1994

* cited by examiner

*Primary Examiner*—Taghi T. Arani
*Assistant Examiner*—Kenneth Chang
(74) *Attorney, Agent, or Firm*—Canon U.S.A., Inc., IP Division

(57) ABSTRACT

A data recording system and method are provided which, when the removal of a recording medium is detected during data writing, the data recording system retains accessed processing not executed in the data writing, and executes the retained access processing when the removed recording medium is inserted again into the data system.

11 Claims, 21 Drawing Sheets

FIG. 12

| | AFTER SERVICE EXECUTION | | AFTER SERVICE EXECUTION, POWER SUPPLY IS TEMPORARILY STOPPED WITHOUT EXECUTING OTHER SERVICES, AND IS THEN RESTARTED | |
|---|---|---|---|---|
| | PASSWORD SETTING STATUS | PASSWORD LOCK STATUS | PASSWORD SETTING STATUS | PASSWORD LOCK STATUS |
| EXECUTE SERVICE (1) /SUCCESSFUL | SET | RELEASED | SET | LOCKED |
| EXECUTE SERVICE (2) /SUCCESSFUL | SET | RELEASED | SET | LOCKED |
| EXECUTE SERVICE (3) /SUCCESSFUL | UNSET | RELEASED | UNSET | RELEASED |
| EXECUTE SERVICE (4) /SUCCESSFUL | SET | LOCKED | SET | LOCKED |
| EXECUTE SERVICE (5) /SUCCESSFUL | SET | RELEASED | SET | LOCKED |
| EXECUTE SERVICE (6) /SUCCESSFUL | UNSET | RELEASED | UNSET | RELEASED |

FIG. 15

| SIZE (BYTE) | DESCRIPTION |
| --- | --- |
| 8 | OEM NAME |
| 2 | SECTOR SIZE |
| 1 | CLUSTER SIZE |
| 2 | RESERVED SECTOR COUNT |
| 1 | FAT COUNT |
| 2 | ROOT DIRECTORY ENTRY COUNT |
| 2 | TOTAL SECTOR COUNT |
| 1 | MEDIA DESCRIPTOR |
| 2 | FAT SIZE (PER SECTOR) |
| 2 | TRACK SIZE (PER SECTOR) |
| 2 | HEAD COUNT |
| 4 | HIDDEN SECTOR COUNT |
| 4 | 32-BIT SECTOR COUNT |
| 1 | DRIVE ID |
| 1 | RESERVED |
| 1 | BOOT SIGNATURE |
| 4 | SERIAL NUMBER |
| 11 | VOLUME NAME |
| 8 | FILE SYSTEM TYPE |

FIG. 19

| BYTE# | BIT7 | BIT6 | BIT5 | BIT4 | BIT3 | BIT2 | BIT1 | BIT0 |
|---|---|---|---|---|---|---|---|---|
| 0 | | RESERVED (ALL 0) | | | ERASE (0) | LOCK_ UNLOCK | CLEAR_ PASSWORD | SET_ PASSWORD |
| 1 | CUR_PWD_LEN | | | | | | | |
| 2 | CURRENT PASSWORD DATA | | | | | | | |
| - | | | | | | | | |
| CUR_PWD_LEN+1 | | | | | | | | |

FIG. 20

| BYTE# | BIT7 | BIT6 | BIT5 | BIT4 | BIT3 | BIT2 | BIT1 | BIT0 |
|---|---|---|---|---|---|---|---|---|
| 0 | RESERVED (ALL 0) | | | | ERASE (0) | LOCK_UNLOCK (0) | CLEAR_PASSWORD (0) | SET_PASSWORD (1) |
| 1 | CUR_PWD_LEN | | | | | | | |
| 2 | CURRENT PASSWORD DATA | | | | | | | |
| - | | | | | | | | |
| CUR_PWD_LEN+1 | | | | | | | | |
| CUR_PWD_LEN+2 | NEW_PWD_LEN | | | | | | | |
| CUR_PWD_LEN+3 | NEW PASSWORD DATA | | | | | | | |
| - | | | | | | | | |
| CUR_PWD_LEN+ NEW_PWD_LEN+2 | | | | | | | | |

FIG. 21

| BYTE# | BIT7 | BIT6 | BIT5 | BIT4 | BIT3 | BIT2 | BIT1 | BIT0 |
|---|---|---|---|---|---|---|---|---|
| 0 | RESERVED (ALL 0) | | | | ERASE (1) | LOCK_UNLOCK (0) | CLEAR_PASSWORD (0) | SET_PASSWORD (0) |

DATA RECORDING SYSTEM AND DATA ACCESS METHOD

BACKGROUND OF THE INVENTION

1. Field of the Invention

The present invention relates to techniques for preventing a file system of a removable storage medium from being destroyed.

2. Description of the Related Art

Currently, removable storage media (such as secure digital (SD) memory cards) that provide excellent transportability and are less expensive than fixed disks, are used, for example, in personal computers, personal digital assistants (PDAs), mobile phones, and digital still cameras. Such SD memory cards serve as storage devices for storing files. Magneto-optical disks and the like are also widely used.

A removable storage medium, such as an SD memory card, has an advantage in that it is excellent in regard to transportability. However, since the user can remove a removable storage medium from a drive unit at any time, a file system may be destroyed and files stored in the storage medium may no longer be accessible if the storage medium is removed from the drive unit during the execution of file access to the medium.

In response, Japanese Patent Laid-Open No. 6-161863 discloses a method in which unique information is compared for the protection of data. Specifically, a drive unit writes unique information to a removable storage medium, temporarily suspends access processing to the medium during the removal of the medium, and retains the unique information in memory. When the storage medium is inserted again, the drive unit compares the unique information retained in its memory to that written in the storage medium. Then, only when they match, the drive unit permits access to the storage medium therein and restarts access processing to the medium.

However, this method has an inherent problem in that although data can be protected with respect to a first information-processing system from which a storage medium has been removed during the execution of input and output operations to and from the storage medium, data cannot be protected with respect to a second information-processing system differing from the first information-processing system. There are a couple of reasons why the aforementioned problem is caused, both of which are discussed below.

First, when a storage medium is inserted into an information-processing system, it cannot be determined, based only on the comparison of unique information, whether or not the storage medium has been removed from another information-processing system during the execution of input and output operations, and in this case, data stored in the storage medium may be modified.

And second, even if a forced removal flag indicating whether or not input and output operations are in progress is written to the storage medium together with unique information, data may be modified because an information-processing system without the above-described data protection function cannot recognize the forced removal flag. In this scenario, once data is modified, the data cannot be recovered or sometimes it may even be destroyed if the storage medium is inserted again into the first information-processing system from which the medium has been removed.

SUMMARY OF THE INVENTION

The present invention overcomes the problems described above, and further provides a data recording system and a data access method that can ensure that data is not modified in other systems. The present invention further can prevent a file system of a recording medium from being inadvertently destroyed.

According to an embodiment of the present invention, a data recording system is provided which includes a removable recording medium; a removal detecting unit configured to detect the removal of the recording medium; a data writing unit configured to write a string of data to the recording medium; an access-processing retaining unit configured to retain access processing left unexecuted by the data writing unit when removal of the recording medium is detected by the removal detecting unit during data writing by the data writing unit; and an unexecuted-access-processing executing unit configured to execute access processing retained by the access-processing retaining unit when the removed recording medium is inserted again into the data recording system.

Further aspects/features of the present invention will become apparent from the following description of exemplary embodiments with reference to the attached Figures.

BRIEF DESCRIPTION OF THE DRAWINGS

FIG. 12 shows password lock statuses when card access functions (C. 1) to (C. 6) are executed, according to the present embodiment.

FIG. 15 shows various parameters in an exemplary basic input/output system parameter block (BPB), according to the present embodiment.

FIG. 19 shows an exemplary architecture of password control data in the card access functions (C. 1) and (C. 3) to (C. 5), according to the present embodiment.

FIG. 20 shows an exemplary architecture of password control data in the card access functions (C. 2), according to the present embodiment.

FIG. 21 shows an exemplary architecture of password control data in the card access function (C. 6), according to the present embodiment.

DESCRIPTION OF THE EMBODIMENTS

Several embodiments and aspects thereof the present invention will now be described with reference to the Figures.

First Exemplary Embodiment

Figure 1:
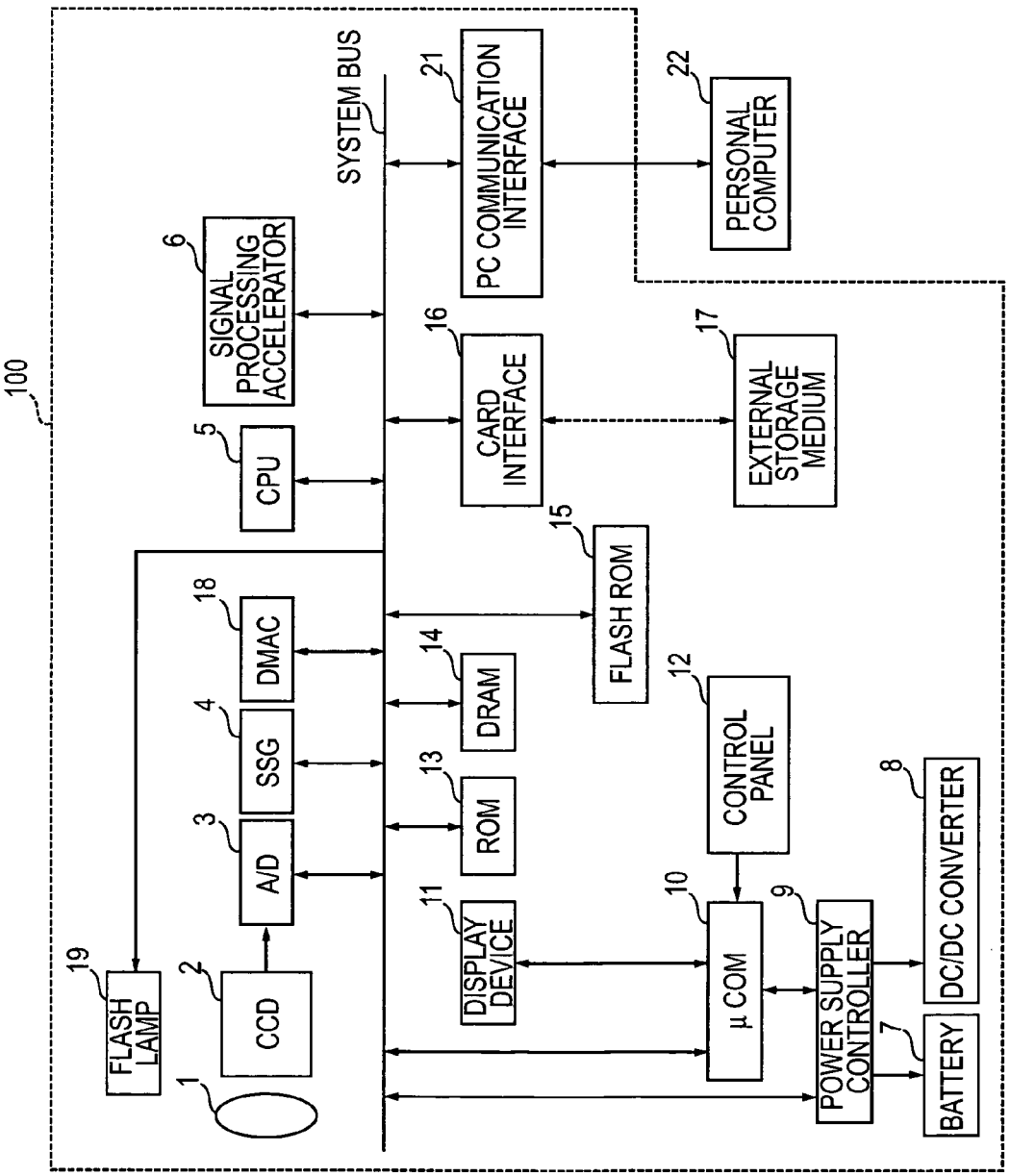
FIG. 1 is a block diagram showing an exemplary architecture of a camera system or the like, according to embodiments of the present invention.

FIG. 1 is a block diagram showing an exemplary architecture of a camera system 100, or the like, according to embodiments of the present invention. The camera system may comprise an electronic camera 100 which includes an external storage medium 17 that can be attached to and removed from the electronic camera 100, a PC communication interface 21, and a personal computer 22 connected via the PC communication interface 21 to the electronic camera 100 in a manner such that the personal computer 22 can communicate with the electronic camera 100.

Light passes through a lens 1 and is output as electric signals from a charge-coupled device (CCD) unit 2. An analog-to-digital (A/D) converter 3 converts analog signals from the CCD unit 2 into digital signals. A synchronizing signal generator (SSG) unit 4 supplies synchronizing signals to the CCD unit 2 and A/D converter 3. A central processing unit (CPU) 5 implements various control operations in the camera system 100.

A signal processing accelerator 6 achieves high-speed signal processing. A direct current to direct current (DC/DC) converter 8 is provided for supplying power from a battery 7 to the entire electronic camera 100. A power-supply controller unit 9 controls the DC/DC converter 8. A microcomputer 10 controls panel operations, a display device 11, and the power supply. A display device 11, such as a liquid crystal panel, displays various information to the user. A control panel 12 provides a release switch and menu buttons that the user manipulates directly.

System programs, including an operating system (OS), are stored in read-only memory (ROM) 13. Dynamic random-access memory (DRAM) 14 serves as main memory of the electronic camera. Flash ROM 15 serves as an internal storage medium. Further, the camera system 100 includes an interface 16 for an SD card, a direct memory access (DMA) controller 18, and a flash lamp 19.

Various operations of the electronic camera 100 during photographing will now be described. First, the CPU 5 detects that the user has pressed the release switch on the control panel 12 and initiates a photographing sequence. The following exemplary operations, which will be described below, may be performed under the control of the CPU 5.

Pressing the release switch causes the SSG unit 4 to drive the CCD unit 2. Analog signals output from the CCD unit 2 are converted by the A/D converter 3 into digital signals. Output from the A/D converter 3 is transferred by the DMA controller 18 to the DRAM 14. Upon completion of a frame by DMA transfer, the CPU 5 initiates a signal processing sequence.

In the signal processing sequence, a signal processing program is read from the flash ROM 15 into the DRAM (main memory) 14, data in the main memory 14 is transferred to the signal processing accelerator 6, which then performs signal processing. The signal processing accelerator 6, which serves as an arithmetic circuit, does not perform the entire signal processing, but assists the CPU 5 in performing particularly time-consuming processing and operates in concert with processing software in the CPU 5. Upon completion of all or a part of the signal processing, the processed data is recorded, as an image file, in the external storage medium 17 via the card interface 16. Data compression is also performed if required for the file format to be used in recording the data.

Figure 2:
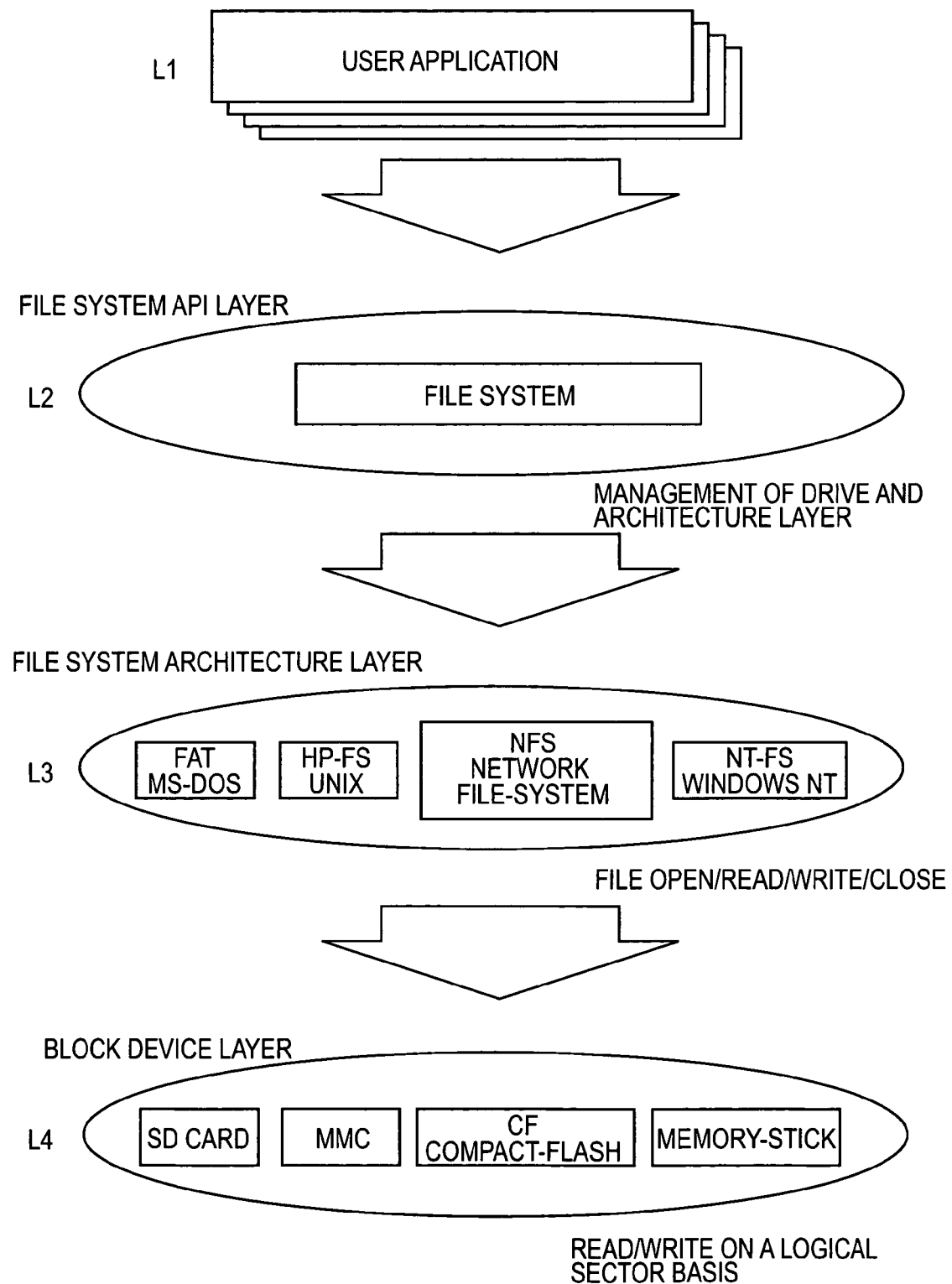
FIG. 2 is a schematic diagram showing an exemplary hierarchical architecture of an image file system, according to the present embodiment.

FIG. 2 is a schematic diagram showing an exemplary hierarchical architecture of an image file system recorded in the external storage medium 17 in FIG. 1. The hierarchical architecture includes, for example, layers L1 to L4. A user application constituting the top layer L1 is software activated in the electronic camera 100. The user application opens a file with its file name and closes the file after read/write operations. A file system application programming interface (API) layer constituting the layer L2 is called with a function call from the user application. The layer L2 associates a drive name with a file system for management purposes. Since a file-system architecture layer (layer L3) is mounted on each drive, a plurality of file system architectures (for example, FAT, NFS, and NTFS) can be provided at the same time. Actual file management is performed at the file-system architecture layer.

Furthermore, a block device layer constitutes a layer L4 at the bottom. The file-system architecture layer L3 uses services provided by the block device layer L4 to implement file input/output operations. The block device layer L4 manages data on a sector (e. g. 512 bytes) basis. The block device layer L4 compensates for differences in inputs/outputs among devices and differences in parameters of a head, cylinder, and the like. A camera system 100 with a plurality of different types of devices thereon can thus be provided.

In the camera system 100 of the present embodiment, a plurality of services provided by the external storage medium 17 constituting the block device to the file system are provided, including, but not limited to: (B. 1) reading of data from sectors specified by logical sector numbers, (B. 2) writing of data to sectors specified by logical sector numbers, and (B. 3) erasure of data in sectors specified by logical sector numbers. The camera system 100 of the present embodiment includes an external storage medium 17 capable of providing at least services (B. 1) and (B. 2).

Another aspect of the present embodiment is that an access lock can be applied to the external storage medium 17. The access lock disables at least services (B. 2) and (B. 3) to prevent internal data from being modified. Except for a system in which the access lock has been set, the access lock cannot be automatically released without the user's input. That is to say, an access lock is applied with a password. An example of the external storage medium with the above-described features includes an SD memory card. For exemplary purposes, an SD memory card having a password lock function allowing an access lock with a password will be utilized as the external storage medium. However, it is noted and acknowledged that other forms of memory may also be utilized in the present embodiment, and thus, should not be limited to only the use of an SD memory. Furthermore, a file allocation table (FAT) file system will be utilized as an example of the file system architecture for the present embodiment.

The password lock function of the SD memory card will now be described. Except for access for the release of a password lock, the password lock function is configured to disable all access including services (B. 2) and (B. 3) involving the modification of data in the SD memory card. The password lock function allows the registration of only a single password and does not allow a multiple lock.

The SD memory card provides a plurality of card access functions, (C. 1) to (C. 6), that perform password control operations, including, but not limited to:

(C. 1) Password setting by specifying a new password when no password is set;

(C. 2) Password change by specifying an old password and a new password when a password has already been set;

(C. 3) Password deletion performed, when a password is set, by specifying the password;

(C. 4) Password lock executed, when a password is set, by specifying the password;

(C. 5) Password unlock executed, when a password lock is applied, by specifying a password; With regard to this, the password is not deleted by this operation; and (C. 6) Forced password unlock executed, when a password lock is applied, by simultaneously executing the release of the password lock and the deletion of all data in the SD memory card without specifying a password.

Figure 5:
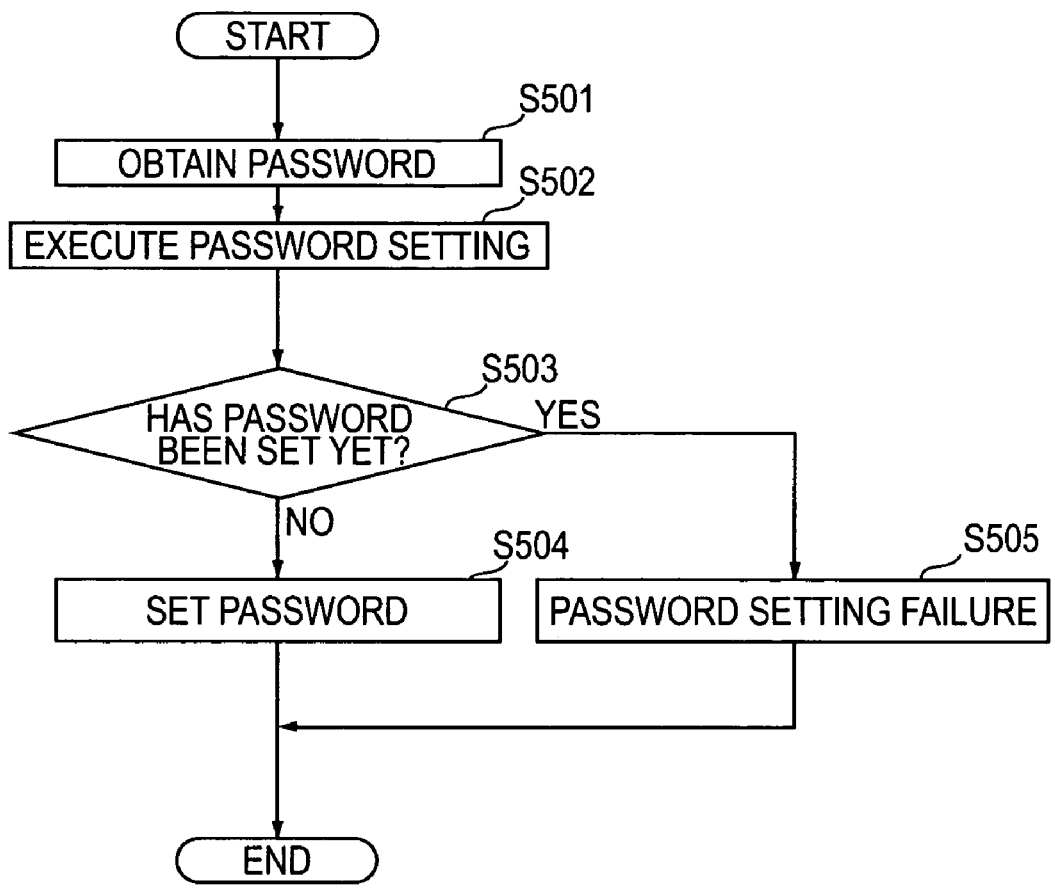
FIG. 5 is a flowchart showing an exemplary password setting function (C. 1) affiliated with card access operation, according to the present embodiment.

FIG. 5 is a flowchart showing an exemplary password setting function (C. 1) affiliated with card access operation. An information device to which an SD memory card is attached obtains a password in step S501. For example, the password is obtained from user input, or is automatically created from card attribute information or from an ID. In step S502, the information device executes a password setting for the SD memory card. Next, an internal controller in the SD memory card allows the following operations to be automatically executed.

In step S503, it is determined whether or not a password has already been set for the SD memory card. If it is determined that a password has already been set, the password setting sequence fails in step S505 and the process ends. If it is determined in step S503 that a password has not been set yet, a password is set in step S504 and the process ends.

Figure 6:
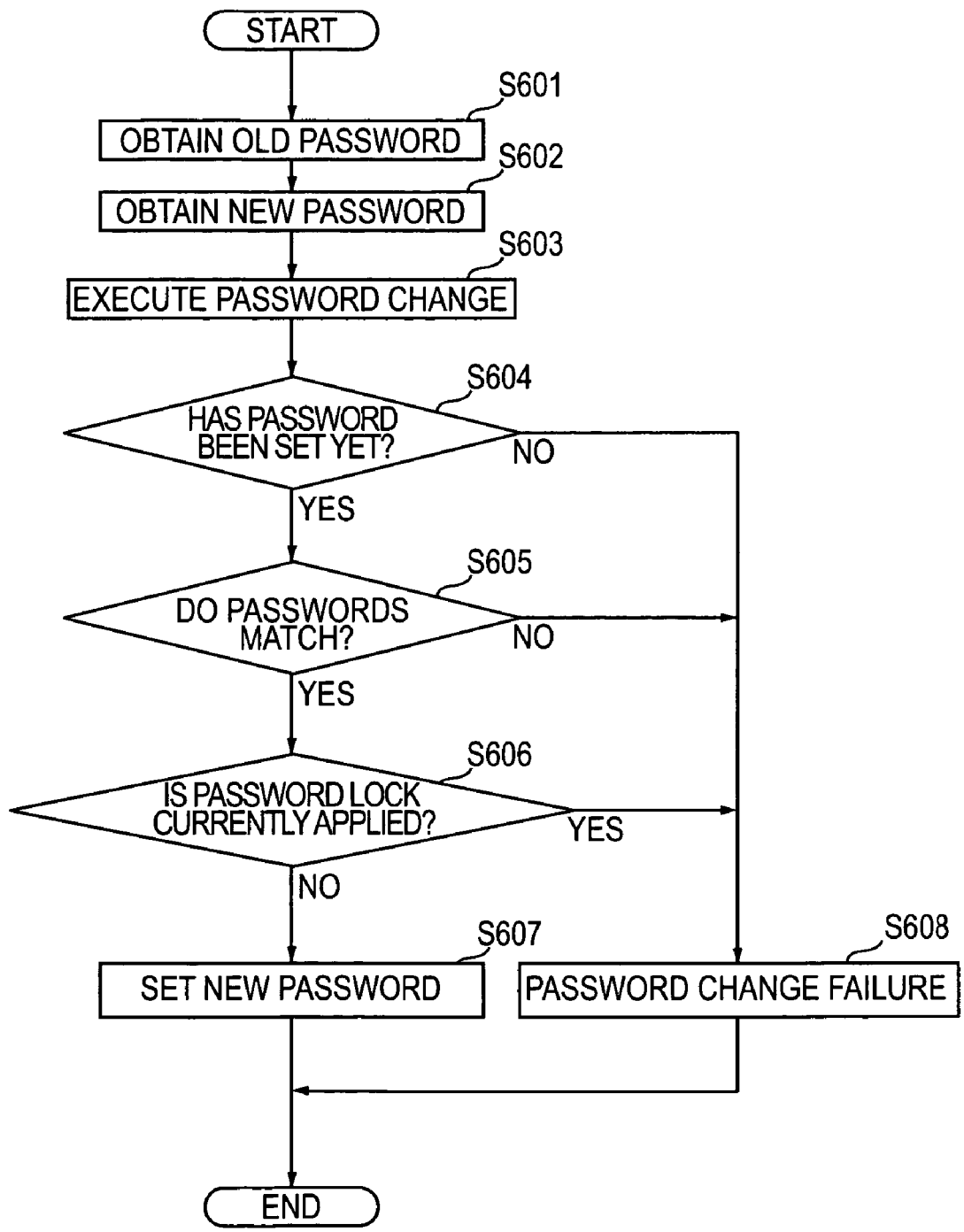
FIG. 6 is a flowchart showing an exemplary password change function (C. 2) affiliated with card access operation, according to the present embodiment.

FIG. 6 is a flowchart showing an exemplary password change function (C. 2) also affiliated with card access operation. In step S601, the information device obtains an old password currently set, and in step S602, obtains a new password to be set. In step S603, the information device executes a password change for the SD memory card. Then, the internal controller in the SD memory card allows the following operations to be automatically executed.

In step S604, it is determined whether or not a password has already been set for the SD memory card. If it is determined that a password has already been set, it is further determined in step S605 whether or not the set password and the obtained old password match. If it is determined that they match, it is further determined in step S606 whether or not a password lock is currently applied. If it is determined that a password lock is not applied, the new password is set in step S607 and the process ends. If it is determined in step S604 that no password has been set, determined in step S605 that the set password and the old password do not match, or determined in step S606 that the password lock is applied, the password change fails in step S608 and the process ends.

Figure 7:
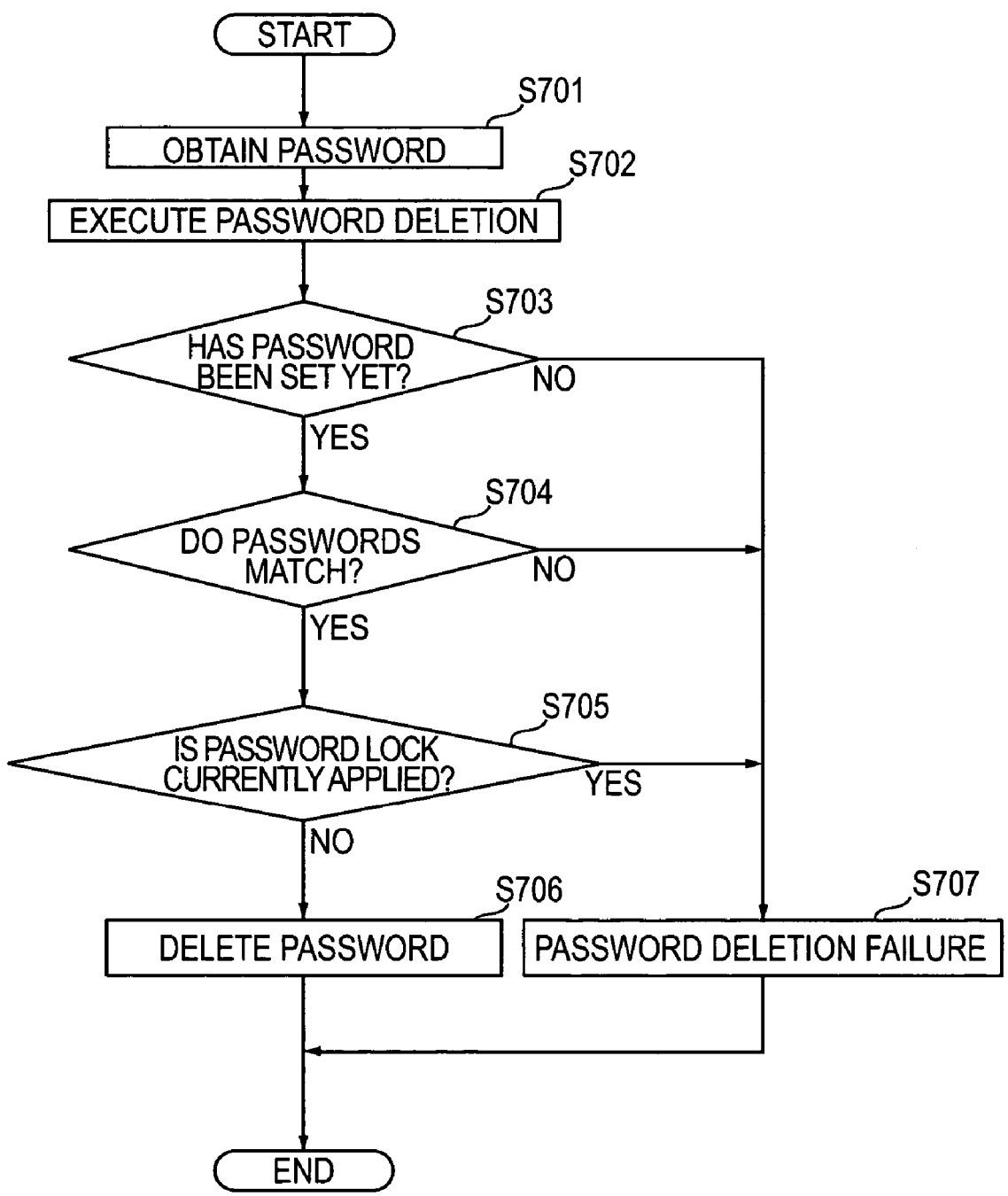
FIG. 7 is a flowchart showing an exemplary password deletion function (C. 3) affiliated with card access operation, according to the present embodiment.

FIG. 7 is a flowchart showing an exemplary password deletion function (C. 3) also affiliated with card access operation. In step S701, the information device obtains a password, and in step S702, executes password deletion for the SD memory card. Next, the internal controller in the SD memory card allows the following operations to be automatically executed.

In step S703, it is determined whether or not a password is currently set. If it is determined that a password is set, it is further determined in step S704 whether or not the set password and the obtained password match. If it is determined that they match, it is further determined in step S705 whether or not a password lock is currently applied. If it is determined that a password lock is not applied, the password is deleted in step S706 and the process ends. If it is determined in step S703 that no password is set, determined in step S704 that the set password and the obtained password do not match, or determined in step S705 that the password lock is currently applied, the password deletion fails in step S707 and the process ends.

Figure 8:
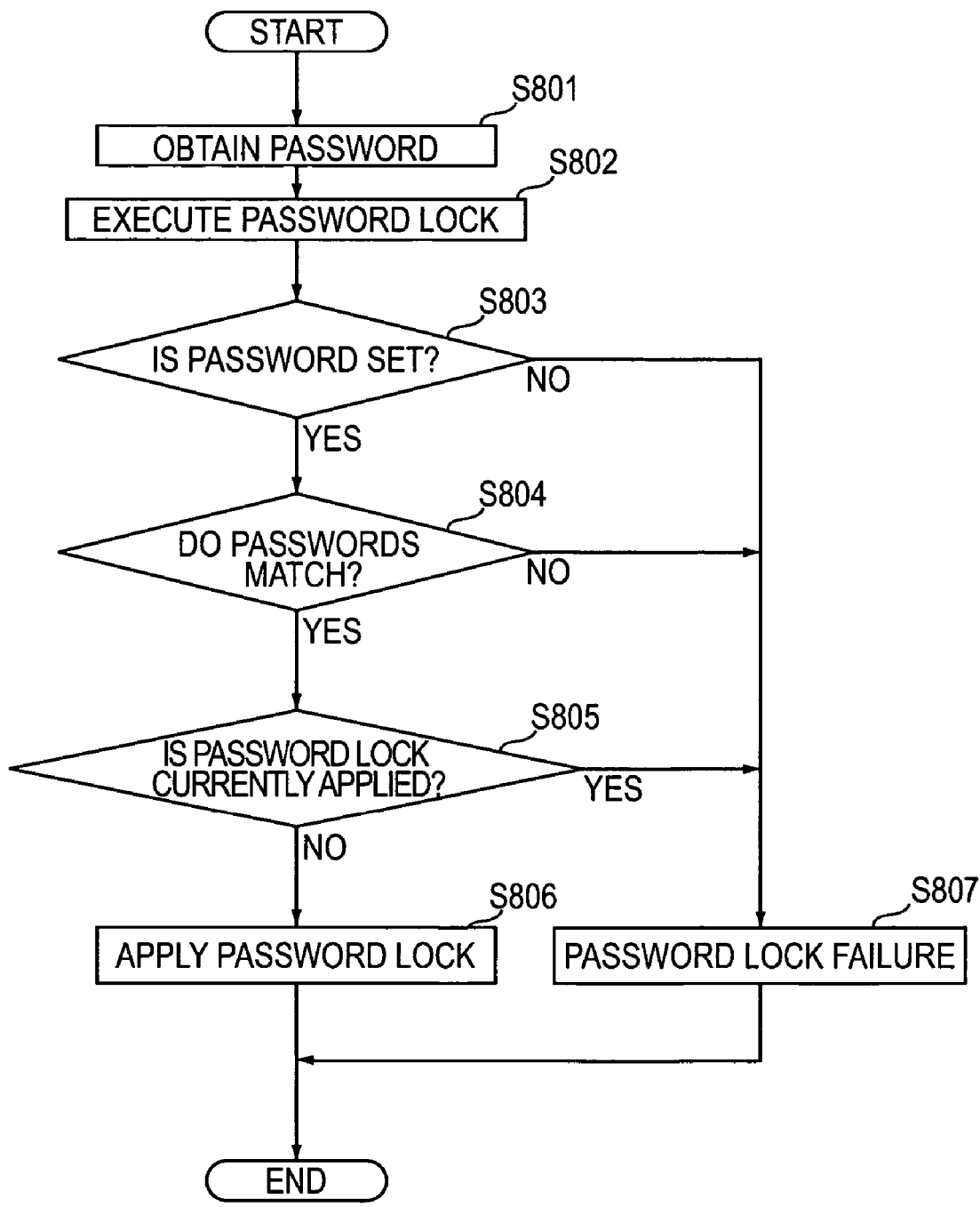
FIG. 8 is a flowchart showing an exemplary password lock function (C. 4) affiliated with card access operation, according to the present embodiment.

FIG. 8 is a flowchart showing an exemplary password lock function (C. 4) also affiliated with card access operation. In step S801, the information device obtains a password, and in step S802, executes a password lock for the SD memory card. Then, the internal controller in the SD memory card allows the following operations to be automatically executed.

In step S803, it is determined whether or not a password is currently set for the SD memory card. If it is determined that a password is set, it is further determined in step S804 whether or not the set password and the obtained password match. If it is determined that they match, it is further determined in step S805 whether or not a password lock is currently applied. If it is determined that a password lock is not applied, a password lock is applied to the SD memory card in step 806 and the process ends. If it is determined in step S803 that no password is set, determined in step S804 that the set password and the obtained password do not match, or determined in step S805 that the password lock is currently applied, the password lock fails in step S807 and the process ends.

Figure 9:
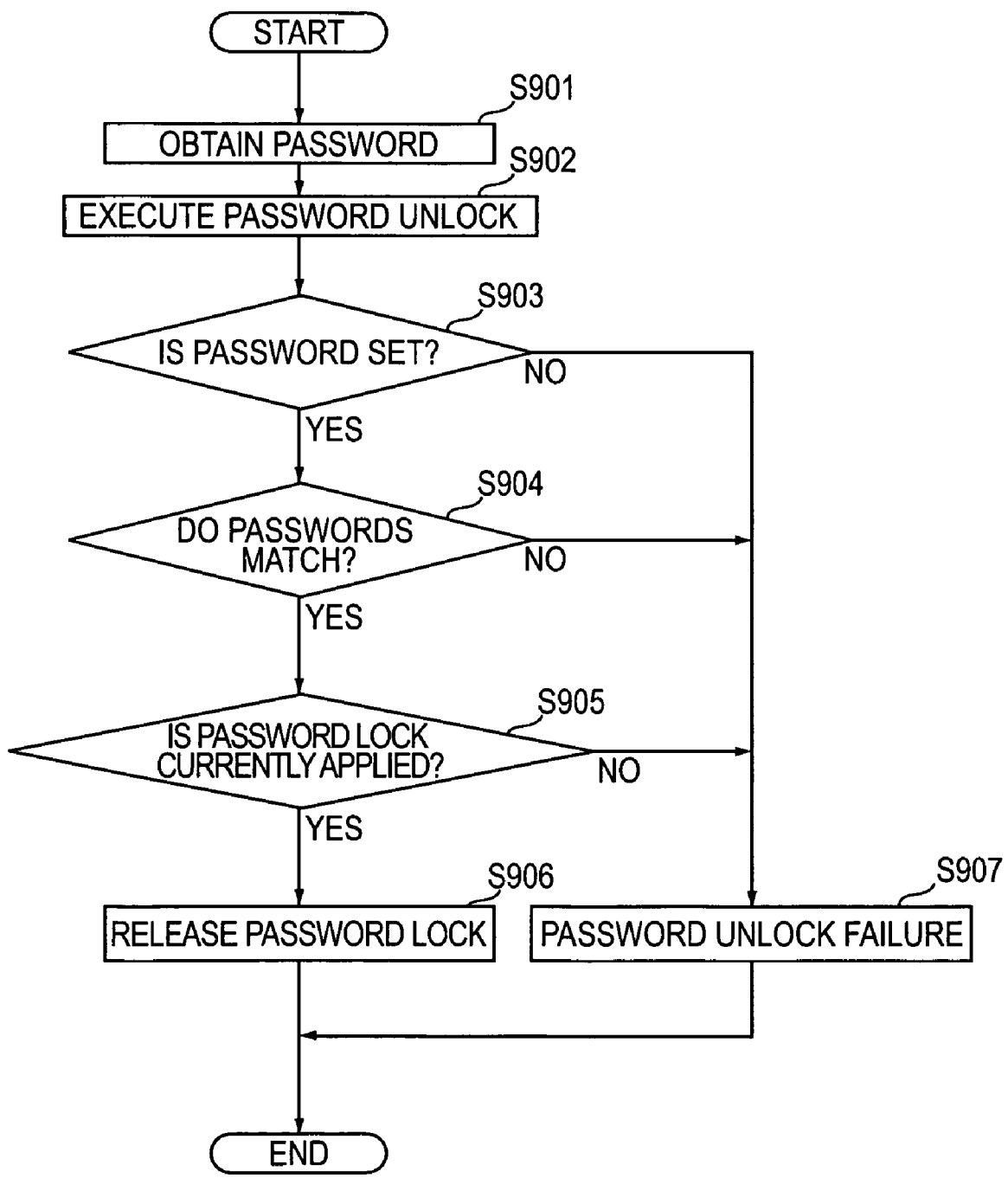
FIG. 9 is a flowchart showing an exemplary password unlock function (C. 5) affiliated with card access operation, according to the present embodiment.

FIG. 9 is a flowchart showing an exemplary password unlock function (C. 5) also affiliated with card access operation. In step S901, the information device obtains a password, and in step S902, executes a password unlock for the SD memory card. Then, the internal controller in the SD memory card allows the following operations to be automatically executed.

In step S903, it is determined whether or not a password is currently set for the SD memory card. If it is determined that a password is set, it is further determined in step S904 whether or not the set password and the obtained password match. If it is determined that they match, it is further determined in step S905 whether or not a password lock is currently applied. If it is determined that a password lock is applied, the password lock for the SD memory card is released in step S906 and the process ends. If it is determined in step S903 that no password is set, determined in step S904 that the set password and the obtained password do not match, or determined in step S905 that a password lock is not currently applied, the password unlock fails in step S907 and the process ends.

Figure 10:
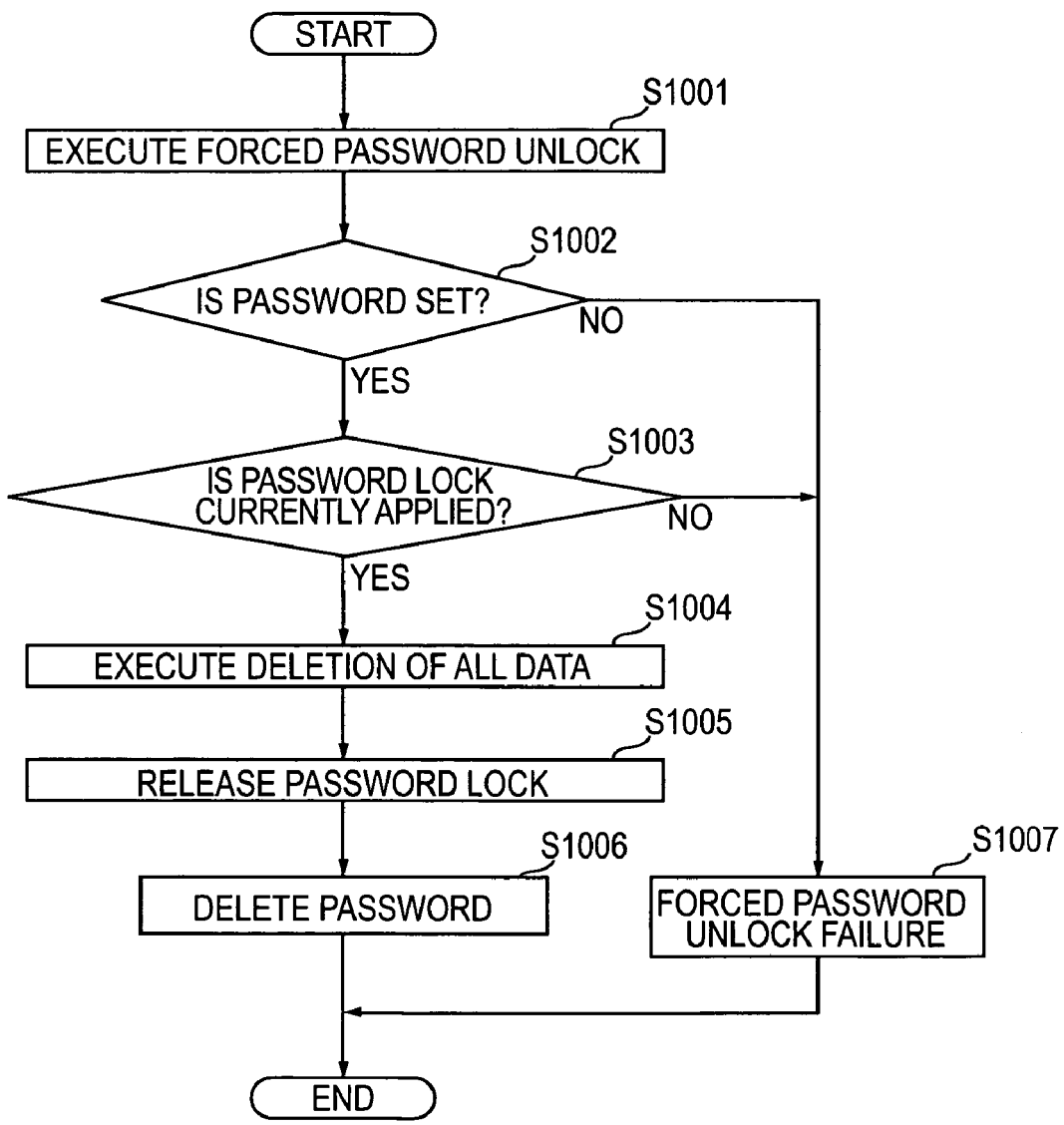
FIG. 10 is a flowchart showing an exemplary forced password unlock function (C. 6) affiliated with card access operation, according to the present embodiment.

FIG. 10 is a flowchart showing an exemplary forced password unlock function (C. 6) also affiliated with card access operation. In step S1001, the information device executes a forced password unlock for the SD memory card. Then, the internal controller in the SD memory card allows the following operations to be automatically executed. In step S1002, it is determined whether or not a password is currently set for the SD memory card. If it is determined that a password is set, it is further determined in step S1003 whether or not a password lock is currently applied. If it is determined that a password lock is applied, all data in the SD memory card is deleted in step S1004. On completion of the deletion of all data, the password lock is released in step S1005, the password is deleted in step S1006, and the process ends. If it is determined in step S1002 that no password is set, or determined in step S1003 that no password lock is applied, the forced password unlock fails in step S1007 and the process ends.

It is further noted that the card access functions (C. 1) to (C. 6) to the SD memory card are performed by sending a command with subsequent password control data to the SD memory card. Exemplary architectures of password control data to be sent to the SD memory card for the execution of the card access functions (C. 1) to (C. 6) will be described in FIGS. 19 to 21. It is noted that each line represents a byte of data. All bytes, and all bits in each byte, are given numbers starting with zero. Further, numbers in parentheses "( )" represent specific values.

FIG. 19 shows an exemplary architecture of password control data for the card access functions (C. 1) and (C. 3) to (C. 5). LOCK_UNLOCK (byte 0, bit 2) is a bit indicating whether or not a password lock is to be applied. A value of 1 represents a password lock and a value of 0 represents a password unlock. The value 1 is assigned to LOCK_UNLOCK for the card access (C. 4), while the value 0 is assigned for all the other card access. CLEAR_PASSWORD (byte 0, bit 1) is a bit indicating whether or not a password is to be deleted. A value of 1 represents password deletion and is assigned to CLEAR_PASSWORD for the card access (C. 3). A value of 0 is assigned for all the other card access. SET_PASSWORD (byte 0, bit 0) is a bit indicating whether or not a password is to be set. A value of 1 represents password setting and is assigned to SET_PASSWORD for the card access (C. 1). A value of 0 is assigned for all the other card access. CUR_PWD_LEN (byte 1) is given the length of a password in bytes. Byte 2 and all bytes that follow are given the body of a password.

FIG. 20 shows an exemplary architecture of password control data for the card access function (C. 2). SE_PASSWORD, CLEAR_PASSWORD, LOCK_UNLOCK, and ERASE are given values in parentheses shown in FIG. 20. CUR_PWD_LEN (byte 1) is given the length, in bytes, of a password currently set. Byte 2 and the subsequent bytes are given the body of the password currently set. The (CUR_PWD_LEN+2) byte is given the length, in bytes, of a password to be newly set. The (CUR_PWD_LEN+3) byte and the subsequent bytes are given the body of the password to be newly set.

FIG. 21 shows an exemplary architecture of password control data for the card access function (C. 6). ERASE (byte 0, bit 3) is a bit indicating a forced password unlock. A value of 1 represents the execution of a forced password unlock. The value 1 is assigned to ERASE for the card access function (C. 6). SET_PASSWORD, CLEAR_PASSWORD, and LOCK_UNLOCK are given values in parentheses shown in FIG. 21.

Figure 18:
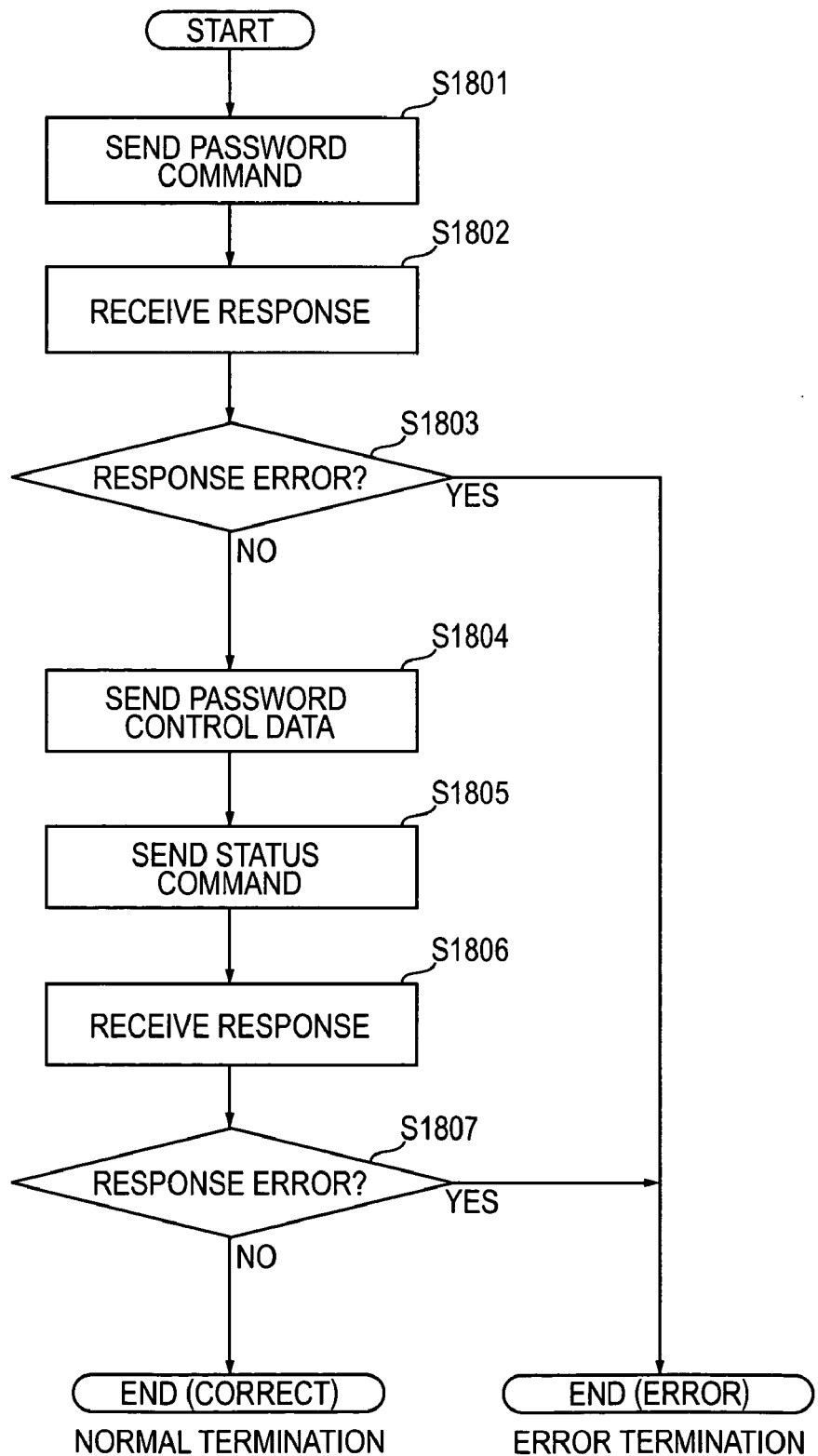
FIG. 18 is a flowchart showing the execution of password control for an SD memory card, according to the present embodiment.

FIG. 18 is a flowchart showing the execution of password control for an SD memory card, according to the present embodiment. In step S1801, the information device supplied with the SD memory card sends a command for password control to the SD memory card, and in step S1802, the information device receives a response to the command. In step S1803, the information device determines whether or not any response error occurs. If the information device determines that no response error has occurred, it sends corresponding password control data to the SD memory card in step S1804. Then, the information device sends a status command in step S1805 and receives a response in step S1806. The response contains a status indicating whether or not the password control has been successful. In step S1807, the information device determines whether or not any response error has occurred and whether or not the password control has been successful. The process normally ends if no error has occurred. The process ends with an error if it is determined in step S1803 or S1807 that a response error has occurred.

Since card access that involves password control is processed synchronously, a password is prevented from being changed or deleted if a password lock is applied. Moreover, the SD memory card is provided with an automatic password-lock function that allows, if a password is set, a password lock to be automatically applied to the SD memory card when power supply is started (e. g. , when the SD memory card is inserted into a system that is ON, or when a system to which the SD memory card is attached is turned ON).

Figure 11:
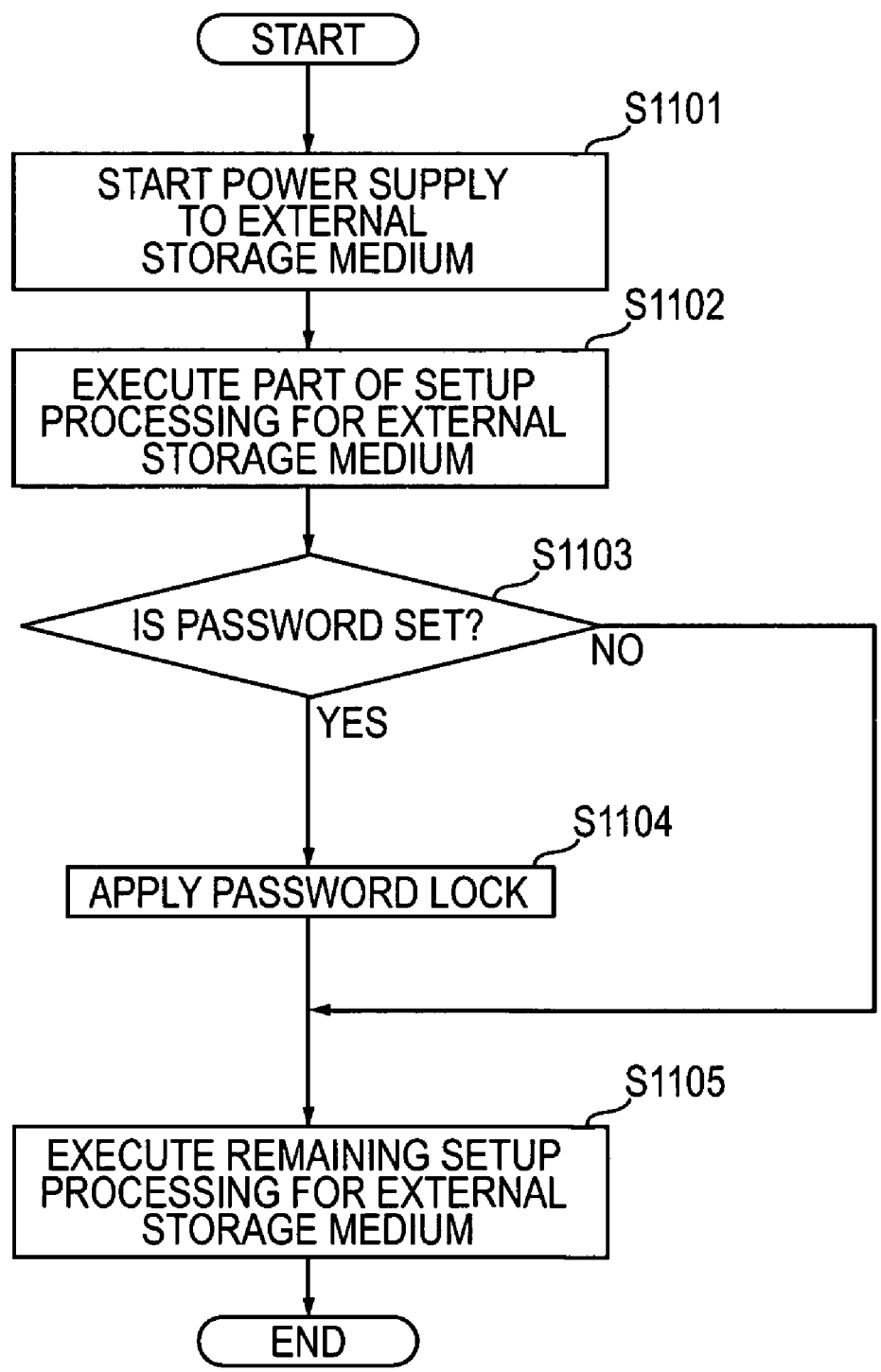
FIG. 11 is a flowchart showing an automatic password-lock function, according to the present embodiment.

FIG. 11 is a flowchart showing an exemplary automatic password-lock function, according to the present embodiment. In step S1101, the information device supplied with the SD memory card starts supplying power to the SD memory card. Next, the internal controller in the SD memory card allows the following operations to be automatically executed. In step S1102, setup processing for the SD memory card is partially executed. At this stage, the SD memory card has not yet started receiving an instruction to perform initialization. In step S1103, it is determined whether or not a password is set for the SD memory card. If it is determined that no password is set, the remaining setup processing is executed in step S1105. If it is determined in step S1103 that a password is set, a password lock is applied to the SD memory card in step S1104 and the remaining setup processing is executed in step S1105. The execution of the remaining setup processing in step S1105 enables the SD memory card to start receiving an instruction to perform initialization.

FIG. 12 shows password lock statuses when card access functions (C. 1) to (C. 6) are executed, according to the present embodiment. In particular, FIG. 12 shows password lock statuses [1] when the card access functions (C. 1) to (C. 6) is executed, and [2] when a power supply is temporarily stopped and then restarted after the execution of the card access functions (C. 1) to (C. 6).

Figure 13:
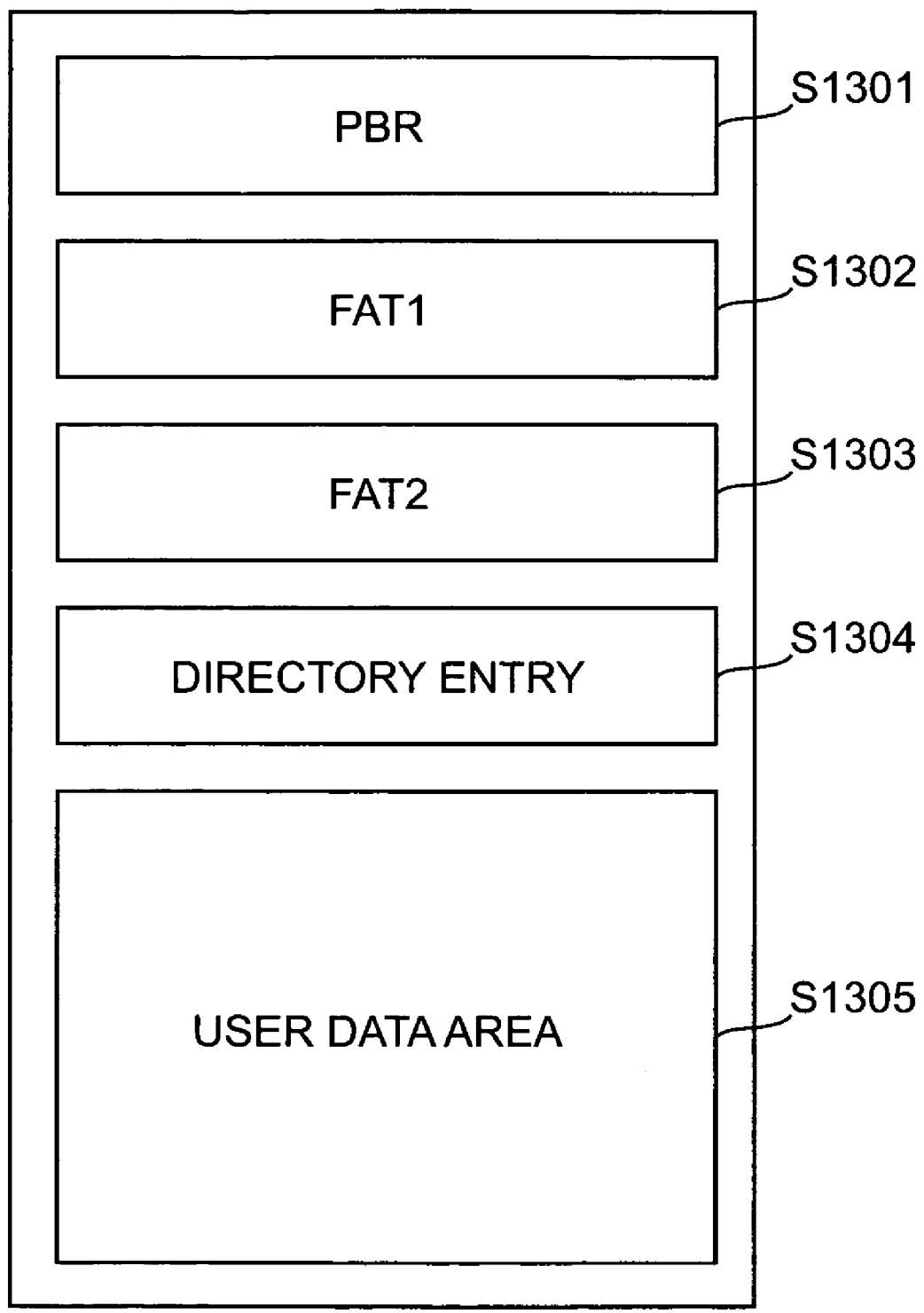
FIG. 13 shows an exemplary architecture of a storage area formatted in a FAT file system, according to the present embodiment.

FIG. 13 shows an exemplary architecture of a storage area formatted in a FAT file system. An exemplary storage area formatted in the FAT file system may include a partition boot record (PBR) S1301, a FAT S1302 and FAT S1303, a directory entry S1304, and a user data area S1305.

Figure 14:
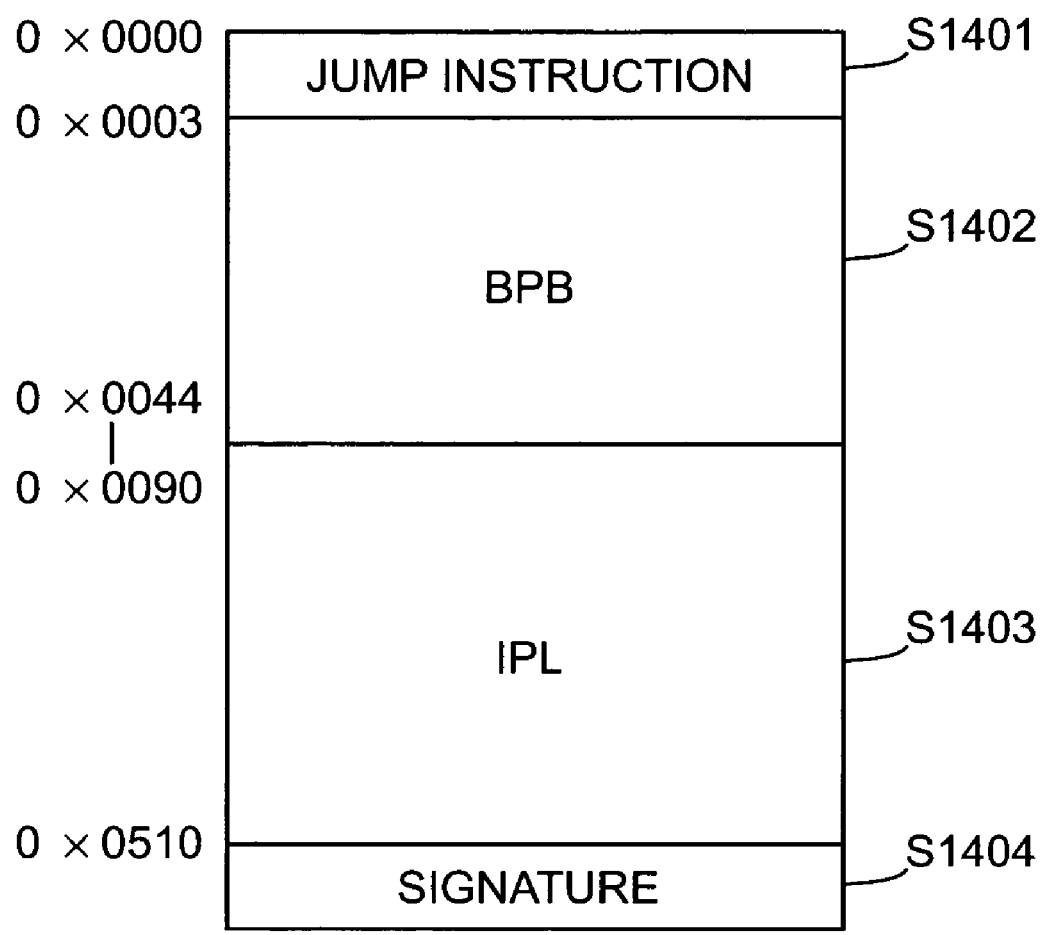
FIG. 14 shows an exemplary architecture of a partition boot record (PBR), according to the present embodiment.

FIG. 14 shows an exemplary architecture of a partition boot record (PBR). A jump instruction S1401 provides an instruction for jumping to an initial program loader (IPL) S1403. A basic input/output system parameter block (BPB) S1402 is also provided which contains information about the file system, for example, information specific to the subject partition. Additionally, a signature S1401 is also provided in the (PBR) S1301 architecture.

FIG. 15 shows various parameters in an exemplary basic input/output system parameter block (BPB) S1402. It is further noted that the IPL S1403 contains a boot program for this partition.

Now referring back to FIG. 13, the FAT S1302 and a FAT 1303 contain positional information about files stored in a user data area S1305. The FAT file system obtains, from the FAT S1302 and the FAT S1303, positional information about files stored in partitions. Even if files are stored in the user data area S1305, the FAT file system cannot recognize them as files if their positional information is not stored in the FAT S1302 and the FAT S1303. A directory entry S1304, therefore, contains management information about files stored in a root directory. Furthermore, the bodies of files are stored in the user data area S1305.

There are provided numerous exemplary file access functions/features (units/modules) (1) to (7) configured to provide file access to the FAT file system, including, but not limited to:

(1) A file creating feature (unit/module) configured to create an empty file, wherein a file created by the file creating feature (unit/module) is opened;

(2) A file deleting feature (unit/module) configured to delete an already existing file;

(3) A file opening feature (unit/module) configured to open an already existing file, wherein the file opening feature (unit/module) detects the beginning of a file when opening it;

(4) A file closing feature (unit/module) configured to close an opened file;

(5) A file reading feature (unit/module) configured to read, in an opened file, file content of a specified size from the position currently detected;

(6) A file writing feature (unit/module) for writing, in an opened file, specified data of a specified size from the position currently detected, wherein if the position currently detected is not the end of the file, the file writing feature (unit/module) overwrites the current file content; and (7) A file seeking feature (unit/module) configured for moving in an opened file, wherein the file seek feature (unit/module) is capable of moving to specified positions, for example, to a relative position from the position currently detected, or to an absolute position, such as to the beginning of a file.

When the file access features/functions (1) to (7) described above are used, the FAT file system divides the file access into operations of the services (B. 1) to (B. 3) provided by the block device on the lower layer, issues them as instructions to the block device, thereby storing file data in a storage medium. For example, to perform file storing processing to store file data in a storage medium, FAT write access that is a writing operation through which positional information about a file is written in the FATs S1302 and S1303, and file write access that is a writing operation through which file content is written in the user data area S1305 are performed. In this case, each of the FAT write access and the file write access is divided into one or more operations of the service (B. 2), and issued as instructions to the block device layer. Upon receipt of the instructions, the block device layer performs data access to the storage medium. Thus, the FAT file system stores a file as data in the storage medium.

In the file storing processing described above, the FAT file system cannot recognize a file until a group of services issued to the block device layer, including at least two operations of the service (B. 2), have all been performed. Like the above-described file storing processing that includes at least one FAT write access and one file write access, a file-access processing set that allows the FAT file system to recognize a file only after the execution of all the access operations is called a FAT-file-system access processing set in the present embodiment.

An executing feature (unit/module) configured to execute the FAT-file-system access processing set in file access to the FAT file system according to the present embodiment will now be described. First, to distinguish the removal of the SD memory card during the execution of the FAT-file-system access processing set from that during any other time, the former is called "forced removal" and the latter is simply called "removal".

In the case of the forced removal of the SD memory card, a password lock is applied to the SD memory card. This prevents data in the SD memory card from being modified during the period between the forced removal and the time when the SD memory card is inserted again. Therefore, if the SD memory card is inserted again, a file-system recovery operation can be performed such that access processing that has not been executed before the forced removal can be performed to allow the recovery of the FAT file system.

To perform the file-system recovery operation, an unexecuted processing list of access processing in the FAT-file-system access processing set is created before the execution of the FAT-file-system access processing set. Moreover, a password is set for the SD memory card to use the automatic password-lock function. To prevent the same password from being set for a plurality of SD memory cards in the case where the forced removal occurs a plurality of times in succession, a unique-password creating feature (unit/Module) configured to create a unique password for each SD memory card is used to generate and set a new password. For example, the unique-password creating feature (unit/module) is adapted to create a unique password according to a specific algorithm based on the combination of attribute information and a serial number of the SD memory card, as attribute information and a serial number can be obtained even if the SD memory card is password locked.

In some scenarios, there is a possibility that a password has already been set before setting the new password. If a password has been set, it is determined whether or not the SD memory card is password locked. If it is determined that the SD memory card is password locked, the FAT-file-system access processing set is terminated without being executed. If it is determined that the SD memory card is not password locked, the password is changed to the new password, and an old password previously set is retained.

The execution of the FAT-file-system access processing set is implemented by unexecuted-processing-list serial processing through which the unexecuted processing list is serially processed and completed access processing is deleted from the list. If the forced removal of the SD memory card occurs during the execution of the unexecuted-processing-list serial processing, the new password is associated with the unexecuted processing list at that point. If the old password is retained, the new password is also associated with the old password. The new password and those associated therewith may be registered in a forced-removal password table. To prepare for the case where the forced removal occurs a plurality of times in succession, the forced-removal password table allows a plurality of items to be registered. If the unexecuted-processing-list serial processing is completed without the occurrence of the forced removal, it is determined whether or not the old password is retained. If it is determined that the old password is retained, the password is changed to the old password. If it is determined that the old password is not retained, the new password is deleted and the process ends.

If the forcibly removed SD memory card is inserted again, the unique-password creating feature (unit/module) creates a target password. Then, the forced-removal password table is searched for the target password. If the target password has been found, the unexecuted processing list associated with the target password is obtained. Before the execution of the unexecuted-processing-list serial processing based on the obtained unexecuted processing list, a password lock is released to use the automatic password-lock function. While the release of the password lock involves the release of the lock, the password is not deleted and remains unchanged as it was set. Then, based on the unexecuted processing list, access processing is executed at the end. The forced removal of the SD memory card during this execution is handled similarly to the forced removal of the SD memory card during the execution of the unexecuted-processing-list serial processing.

Figure 3:
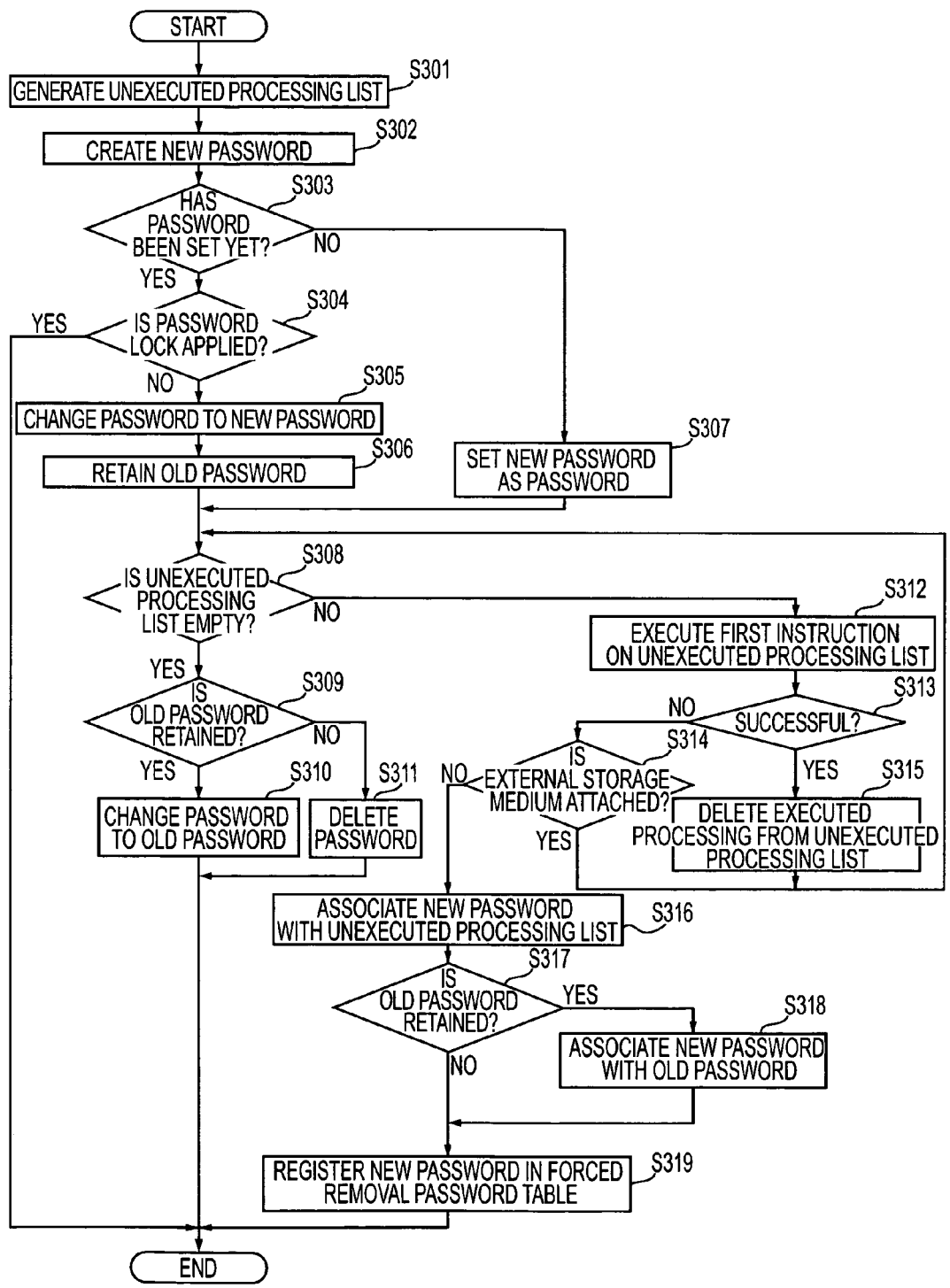
FIG. 3 is a flowchart showing exemplary operations in the execution of a file allocation table (FAT)-file-system access processing set, according to the present embodiment.

FIG. 3 is a flowchart showing exemplary operations in the execution of the FAT-file-system access processing set for the SD memory card in the camera system 100, according to the present embodiment. The aforementioned operations will now herein be described with reference to FIG. 3.

First, in step S301, the unexecuted processing list is generated from the FAT-file-system access processing set. In step S302, the unique-password creating feature (unit/module) creates the new password. In step S303, it is determined whether or not a password has already been set for the SD memory card. If it is determined that no password is currently set, the new password is set for the SD memory card in step S307. If it is determined in step S303 that a password has already been set, it is determined in step S304 whether or not the SD memory card is password locked. If it is determined that the SD memory card is not password locked, the password is changed to the new password in step S305, and the old password is retained in step S306. If it is determined in step S304 that the SD memory card is password locked, the process ends with an error.

The following process is repeated until it is determined in step S308 that the unexecuted processing list is empty, or it is determined in step S314 that the SD memory card is not in the camera system. First, in step S308, it is determined whether or not the unexecuted processing list is empty. If it is determined that the unexecuted processing list is not empty, access processing to be initially executed is obtained from the unexecuted processing list and executed in step S312. Then in step S313, it is determined whether or not the execution of the access processing has been successful. If it is determined that the execution has been successful, the access processing is deleted from the unexecuted processing list in step S315, and the process returns to step S308. If it is determined in step S313 that the execution has been unsuccessful, it is determined in step S314 whether or not the SD memory card is in the camera system. If it is determined that the SD memory card is in the camera system, the process returns to step S308.

If it is determined in step S314 that the SD memory card is not in the camera system, the unexecuted processing list is associated with the new password in step S316 based on the determination that the forced removal has been detected. Then it is further determined in step S317 whether or not the old password is retained. If it is determined that the old password is retained, the old password is associated with the new password in step S318. In step S319, the new password and those associated with the new password are registered in the forced-removal password table, and the process ends with an error. If it is determined in step S308 that the unexecuted processing list is empty, it is determined in step S309 whether or not the old password is retained. If it is determined that the old password is retained, the password for the SD memory card is changed from the new password to the old password in step S310, and the process ends normally. If it is determined in step S309 that the old password is not retained, the new password is deleted in step S311 and the process ends normally.

Figure 4:
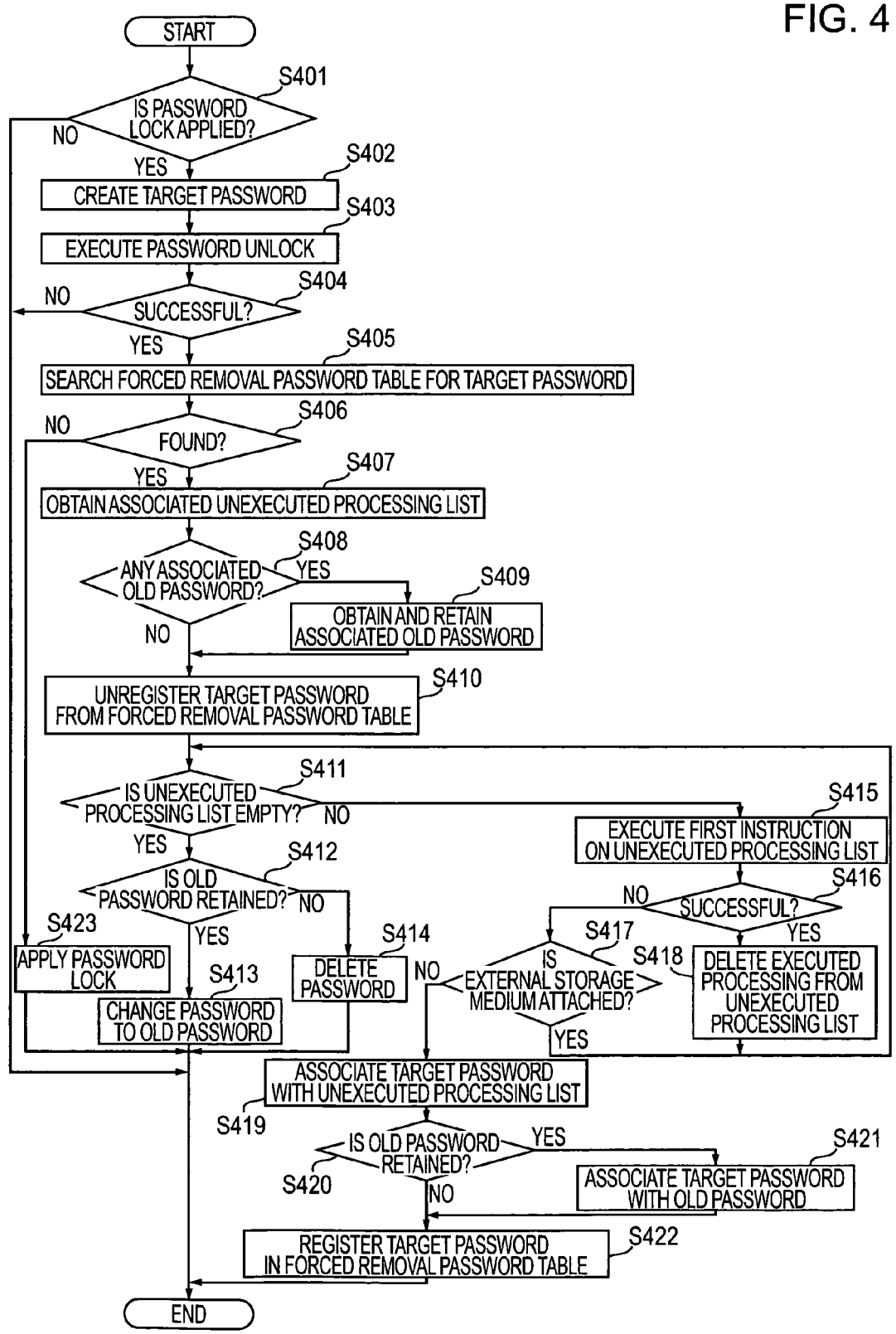
FIG. 4 is a flowchart showing exemplary operations when an SD memory card is inserted into the camera system from FIG. 1, according to the present embodiment.

FIG. 4 is a flowchart showing exemplary operations responsive to the insertion of the SD memory card into the camera system 100, according to the present embodiment. The insertion of the SD memory card here refers to the case where the SD memory card is inserted into an SD memory card slot when the camera system is ON, or the case where the SD memory card is inserted into an SD memory card slot when the camera system is OFF, and then the SD memory card is detected when the camera system is turned ON. The operations will now be described with reference to FIG. 4.

First, in step S401, it is determined whether or not the detected SD memory card is password locked. If it is determined that the SD memory card is password locked, the unique-password creating feature (unit/module) creates a target password in step S402. The release of the password lock is executed with the target password in step S403, and it is determined in step S404 whether or not the password lock has been successfully released. If it is determined that the password lock has been successfully released, the forced-removal password table is searched for the target password in step S405, and it is determined in step S406 whether or not the target password has been found. If it is determined that the target password has been found, the unexecuted processing list associated with the target password is obtained from the forced-removal password table in step S407. Moreover, if it is determined in step S408 that there is the old password associated with the target password, the old password is obtained and retained in step S409. Then, in step S410, the target password and those associated with the target password are unregistered from the forced-removal password table.

The following process is repeated until it is determined in step S411 that the unexecuted processing list is empty, or it is determined in step S417 that the SD memory card is not in the camera system. First, in step S411, it is determined whether or not the unexecuted processing list is empty. If it is determined that the unexecuted processing list is not empty, access processing to be initially executed is obtained from the unexecuted processing list and executed in step S415. Then in step S416, it is determined whether or not the execution of the access processing has been successful. If it is determined that the execution has been successful, the access processing is deleted from the unexecuted processing list in step S418, and the process returns to step S411. If it is determined in step S416 that the execution has been unsuccessful, it is determined in step S417 whether or not the SD memory card is in the camera system. If it is determined that the SD memory card is in the camera system, the process returns to step S411.

If it is determined in step S417 that the SD memory card is not in the camera system, the unexecuted processing list is associated with the new password in step S419 based on the determination that the forced removal has been detected. Then it is further determined in step S420 whether or not the old password is retained. If it is determined that the old password is retained, the old password is associated with the new password in step S421. In step S422, the new password and those associated with the new password are registered in the forced-removal password table, and the process ends with an error. If it is determined in step S411 that the unexecuted processing list is empty, it is determined in step S412 whether or not the old password is retained. If it is determined that the old password is retained, the password for the SD memory card is changed from the new password to the old password in step S413, and the process ends normally. If it is determined in step S412 that the old password is not retained, the new password is deleted in step S414 and the process ends normally.

If it is determined in step S401 that the SD memory card is not password locked, or if it is determined in step S404 that the release of the password lock has been unsuccessful, the process ends normally because the forced removal of the SD memory card in the camera system has not occurred. Moreover, if it is determined in step S406 that the target password has not been found, the forced removal of the SD memory card has not occurred. In this case, in step S423, a password lock is applied to the SD memory card again, and the process ends normally.

Thus, even if the forced removal of the SD memory card has occurred during the execution of the FAT-file-system access processing set, the application of a password lock ensures that data is not modified in other systems, and allows unexecuted processing to be executed when the SD memory card is inserted into the camera system again. The FAT file system can thus be prevented from being destroyed.

Second Exemplary Embodiment

A second exemplary embodiment of the present invention will now be described based on the camera system 100 and an SD memory card similar to that of the first embodiment. In the second embodiment, if the SD memory card has been forcibly removed from the camera system during the execution of the FAT-file-system access processing set, the unexecuted processing list and the old password are stored in a specific area of the SD memory card. Examples of the specific area include an unused block not secured by the file system, and a storage area other than the user data area. An example of the storage area is a protected area of the SD memory card. Storing the unexecuted processing list and the old password in a specific area of the SD memory card allows a file-system recovery operation in a second camera system that differs from a first camera system from which the SD memory card has been forcibly removed. In this case, the unique-password creating feature (unit/module) needs to create a password that allows a password lock to be released at least in both the first camera system and the second camera system. Since the first camera system and the second camera system have nothing in common other than the SD memory card therein, the password is created based on unique information, such as attribute information, about the SD memory card, the information being independent of the information processing systems.

Figure 16:
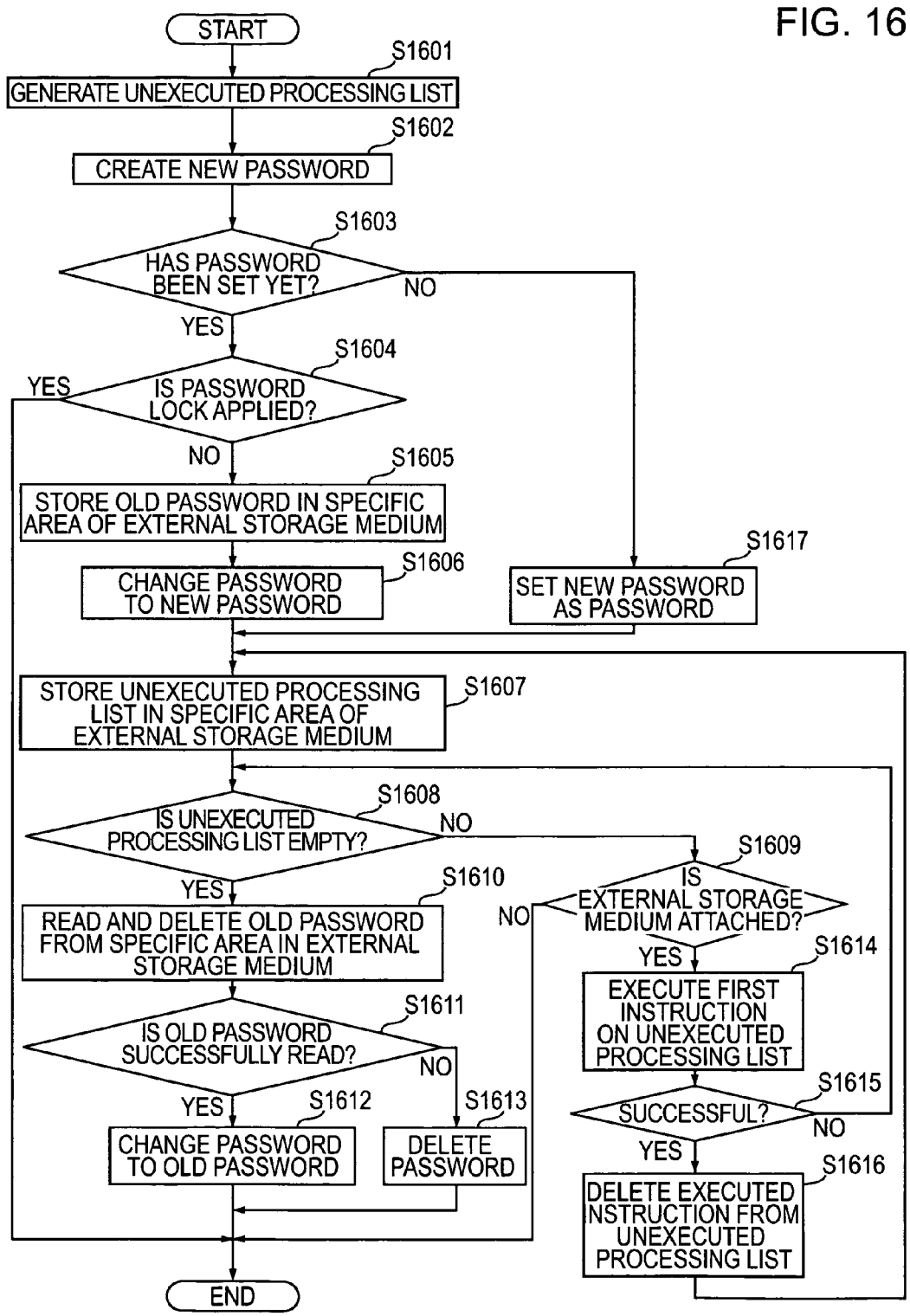
FIG. 16 is a flowchart showing exemplary operations in the execution of a FAT-file-system access processing set, according to the present embodiment.

FIG. 16 is a flowchart showing exemplary operations in the execution of the FAT-file-system access processing set, according to an aspect of the second embodiment of the present invention. First, in step S1601, an unexecuted processing list is generated. Then, the unique-password creating feature (unit/module) creates a new password in step S1602, and it is determined in step S1603 whether or not a password is currently set for the SD memory card. If it is determined that a password is already set, it is determined in step S1604 whether or not the SD memory card is password locked. If it is determined that the SD memory card is not password locked, the set old password is stored in a specific area of the SD memory card in step S1605 and is replaced with the new password in step S1606. If it is determined in step S1603 that no password is currently set, the created new password is set as a password for SD memory card in step S1617. If the password has been set (step S1617) or changed (step S1606), the unexecuted processing list is stored in a specific area of the SD memory card (step S1607). If it is determined in step S1604 that the SD memory card is password locked, the process ends with an error.

The following process is repeated until it is determined in step S1608 that the unexecuted processing list is empty, or it is determined in step S1609 that the SD memory card is not in the camera system. First, in step S1608, it is determined whether or not the unexecuted processing list is empty. If it is determined that the unexecuted processing list is not empty, it is further determined in step S1609 whether or not the SD memory card is in the camera system. If it is determined that the SD memory card is in the camera system, access processing to be initially executed is obtained from the unexecuted processing list and executed in step S1614. Then in step S1615, it is determined whether or not the execution of the access processing has been successful. If it is determined that the execution has been successful, the executed access processing is deleted from the unexecuted processing list in step S1616, the unexecuted processing list is stored in a specific area of the SD memory card in step S1607, and the process returns to step S1608. If an unexecuted processing list already exists in the specific area, the existing unexecuted processing list is overwritten. If it is determined in step S1615 that the execution has been unsuccessful, the process returns to step S1608 to execute the access processing again.

If it is determined in step S1608 that the unexecuted processing list is empty, the old password is read from a specific area of the SD memory card and deleted from the specific area in step S1610. In step S1611, it is determined whether or not the old password has been successfully read. If it is determined that the old password has been successfully read, the set password is replaced with the old password in step S1612 and the process ends normally. If it is determined in step S1611 that the old password has not been successfully read, the password is deleted in step S1613 and the process ends normally. If it is determined in step S1609 that the SD memory card is not in the camera system, the process ends with an error based on the determination that the forced removal has occurred.

A file-system recovery operation of the second embodiment of the present invention will now be described. When the SD memory card is inserted into the second camera system, it is determined whether or not the SD memory card was forcibly removed previously. If forcibly removed, the SD memory card is locked with a password created by the unique-password creating feature (unit/module). Therefore, the unique-password creating feature (unit/module) creates a password and attempts to release the password lock with the created password. Here, the unique-password creating feature (unit/module) is implemented in the first camera system and second camera system according to the algorithm based on unique information about the SD memory card.

Figure 17:
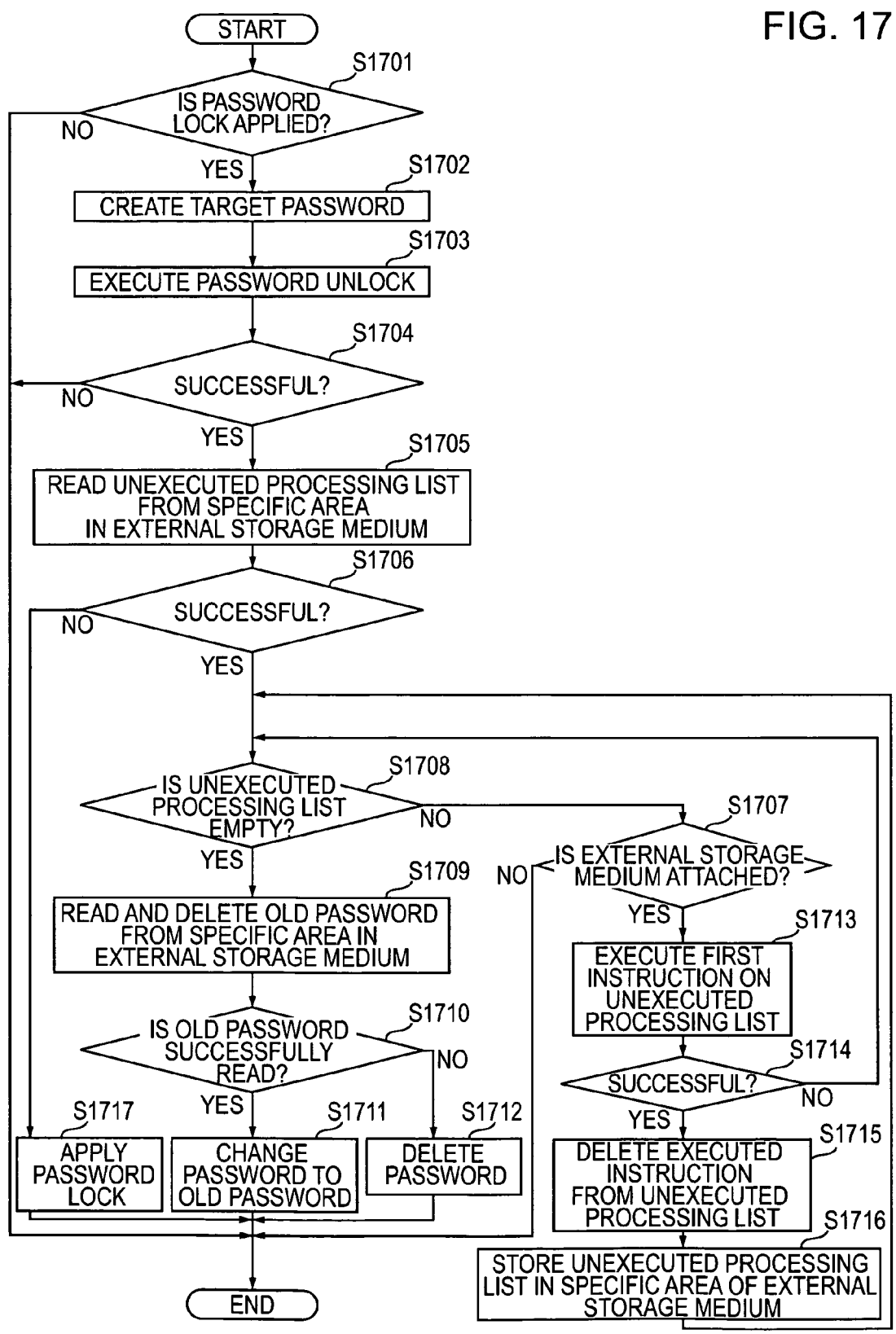
FIG. 17 is a flowchart showing exemplary operations when an SD memory card is inserted into a second camera system, according to the present embodiment.

FIG. 17 is a flowchart showing exemplary operations when an SD memory card is inserted into a second camera system, according to an aspect of the second embodiment of the present invention. First, in step S1701, it is determined whether or not the SD memory card is password locked. If it is determined that the SD memory card is password locked, the unique-password creating feature (unit/module) creates a target password in step S1702. An attempt is made to release the password lock in step S1703, and it is determined in step S1704 whether or not the password lock has been successfully released. If it is determined that the password lock has been successfully released, an unexecuted processing list is read from a specific area of the SD memory card in step S1705 and it is determined in step S1706 whether or not the unexecuted processing list has been successfully read. If it is determined that the unexecuted processing list has not been successfully read, the SD memory card is password locked in step S1717 and the process ends normally. If it is determined in step S1701 that the SD memory card is not password locked, or if it is determined in step S1704 that the password lock has not been successfully released, the process ends normally.

If it is determined in step S1706 that the unexecuted processing list has been successfully read, the following process is repeated until it is determined in step S1708 that the unexecuted processing list is empty, or it is determined in step S1707 that the SD memory card is not in the camera system. First, in step S1708, it is determined whether or not the unexecuted processing list is empty. If it is determined that the unexecuted processing list is not empty, it is further determined in step S1707 whether or not the SD memory card is in the camera system. If it is determined that the SD memory card is in the camera system, access processing to be initially executed is obtained from the unexecuted processing list and executed in step S1713. Then in step S1714, it is determined whether or not the execution of the access processing has been successful. If it is determined that the execution has been successful, the executed access processing is deleted from the unexecuted processing list in step S1715, the unexecuted processing list is stored in a specific area of the SD memory card in step S1716, and the process returns to step S1708. If an unexecuted processing list already exists in the specific area, the existing unexecuted processing list is overwritten. If it is determined in step S1714 that the execution has been unsuccessful, the process returns to step S1708 to execute the access processing again.

If it is determined in step S1708 that the unexecuted processing list is empty, the old password is read from a specific area of the SD memory card and deleted from the specific area in step S1709. In step S1710, it is determined whether or not the old password has been successfully read. If it is determined that the old password has been successfully read, the set password is replaced with the old password in step S1711 and the process ends normally. If it is determined in step S1710 that the old password has not been successfully read, the password is deleted in step S1712 and the process ends normally. If it is determined in step S1707 that the SD memory card is not in the camera system, the process ends with an error based on the determination that the forced removal has occurred.

When the FAT-file-system access processing set is executed as described above, even if the forced removal of the SD memory card has occurred during the execution of the FAT-file-system access processing set in the first camera system, the FAT file system can be prevented from being destroyed since the SD memory card is password locked, the unexecuted processing list is stored in the SD memory card, and the unexecuted processing is executed when the SD memory card is inserted into the second camera system.

While the camera system 100 is used as an example in the first and second embodiments described above, the present invention is applicable to any system that can accommodate an SD memory card or the like. Moreover, while the FAT file system is taken as an example of a file system architecture in the first and second embodiments described above, the present invention is applicable to any file system architecture. Furthermore, while the SD memory card is taken as an example in the first and second embodiments described above, the present invention is applicable to any other removable external storage medium having the access lock function using a password and the automatic password-lock function.

While the external storage medium having the access lock function using a password and the automatic password-lock function is taken as an example in the first and second embodiments described above, the present invention is applicable to any external storage medium that can be password locked after the forced removal.

Further, it is noted that the present invention is not limited to the first and second embodiments where the entire FAT-file-system access processing set is retained as an unexecuted processing list. For example, to protect only the consistency of the FAT file system, partial access processing, which is included in the FAT-file-system access processing set and in which a minimum access processing group that can protect the FAT file system is included, is retained as a minimum processing list. Then, in the case of the occurrence of forced removal of the SD memory card, access processing included in both an unexecuted processing list at that point and the minimum processing list is associated with a password and is registered, as an unexecuted processing list, in the forced-removal password table. Moreover, the present invention is applicable not only to the first and second embodiments, but also to the case where retaining and registering means such as those described above are used.

While the password lock function that does not allow a multiple lock is taken as an example in the first and second embodiments described above, the present invention is applicable, even if the password lock function allows a multiple lock, to the case as long as the system includes a multiple-password retaining feature (unit/module) (D. 1) and a multiple lock recovery feature (unit/module) (D. 2), both of which are now herein described in further detail below.

The multiple-password retaining feature (unit/module) (D. 1) is configured to execute, in performing the FAT-file-system access processing set on a multi-locked external storage medium, the release of all password locks applied at that point before starting the unexecuted-processing-list serial processing, and retains all passwords used for releasing the password locks and data representing the order of use of all the passwords. The multiple-lock recovery feature (unit/module) (D. 2) is configured to bring the external storage medium back to a multi-locked state by using a plurality of passwords and data representing the order of application of password locks that are retained by the multiple-password retaining feature (unit/module).

While, in the first and second embodiments described above, the password locking feature (unit/module) is taken as an example of access locking feature (unit/module) for blocking access to an external storage medium, it is also acknowledged that the present invention is applicable to any external storage medium having an access locking feature (unit/module) that can ensure that the access lock is not automatically released in other systems without the user's intention.

While, in the first and second embodiments described above, the locking function of the SD memory card is taken as an example of a function that can ensure that no modification is made to internal data during the period between the forced removal and the reinsertion of an external storage medium, it is acknowledged that the present invention is applicable to any case where a function that can ensure that no modification is made to internal data during the period between the forced removal and the reinsertion is provided.

While, in the first and second embodiments described above, the forced removal of an external storage medium is taken as an example of a cause of forced interruption of file access processing, it is acknowledged that the present invention is applicable to any case where the forced interruption of file access processing is caused by anything. However, it should be noted that if postprocessing to be executed after an event causing the forced interruption cannot be executed because the forced interruption is caused, for example, by system power-off, the postprocessing may be executed before the occurrence of the event that causes the forced interruption. In other words, the present invention is applicable to any case where postprocessing to be executed after an event causing the forced interruption can be executed before the occurrence of the event, even if the postprocessing cannot be executed after the event due to, for example, system power-off.

While the present invention has been described with reference to several exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-287651 filed Sep. 30, 2004, which is hereby incorporated by reference herein in its entirety.

What is claimed is:

1. A data recording system comprising:
 a removable recording medium having a locking function for blocking write access, the locking function including a locking enabling unit configured to enable the locking function when the recording medium has been removed, a lock determining unit configured to determine when the recording medium has been inserted again, whether or not the locking function is enabled, and an unlocking unit configured to release a lock if the lock determining unit determines that the locking function is enabled, the locking function being implemented by a password locking mechanism configured to apply a lock with a password;
 a removal detecting unit configured to detect the removal of the recording medium;
 a data writing unit configured to write a string of data to the recording medium;
 an access-processing retaining unit configured to retain access processing left unexecuted by the data writing unit when the removal of the recording medium is detected by the removal detecting unit during data writing by the data writing unit;
 an unexecuted-access-processing executing unit configured to execute unexecuted access processing retained by the access-processing retaining unit when the removed recording medium is inserted again into the data recording system;
 a password creating unit configured to create a password;
 a password locking unit configured to supply the locking enabling unit with the password created by the password creating unit;
 a password retaining unit configured to retain the password created by the password creating unit;
 a password unlocking unit configured to supply the unlocking unit with the password retained by the password retaining unit;
 an access/password retaining unit configured to associate an unexecuted access-processing group retained by the access-processing retaining unit with the password created by the password creating unit, and retain the unexecuted access-processing group and the password;
 an associated-password unlocking unit configured for attempting, in the password unlocking unit, to release the password lock with the password retained by the access/password retaining unit; and
 an execution unit configured to cause the unexecuted-access-processing executing unit to execute the unexecuted access-processing group associated with the password if the password lock is successfully released by the associated-password unlocking unit.

2. The data recording system according to claim 1, wherein the password creating unit includes an attribute-information password-creating unit configured to create a password based on attribute information about the recording medium.

3. The data recording system according to claim 1, wherein the unexecuted-access-processing executing unit includes a deletion access unit configured to perform deletion, and the locking function includes a disabling unit configured to disable the deletion access unit.

4. The data recording system according to claim 1, wherein the access/password retaining unit is capable of retaining a plurality of sets, each set including an unexecuted access-processing group and a password that are associated with each other,
 wherein the associated-password unlocking unit is capable of performing a password unlocking operation at least once with at least one password retained by the access/password retaining unit.

5. The data recording system according to claim 1, further comprising a multiple-password-lock preventing unit configured to perform a password lock operation after releasing a password lock by the password unlocking unit if a password lock is already applied when a password lock operation is to be performed by the password locking unit.

6. The data recording system according to claim 1, wherein the unexecuted access processing is stored in the removable recording medium, thereby allowing a file-system recovery operation in a different data recording system.

7. A data access method for a data recording system accessible to a removable recording medium, the data access method comprising:
 detecting the removal of a recording medium, the recording medium having a locking function for blocking write access which includes enabling a locking function when the recording medium has been removed, determining, when the recording medium has been inserted again, whether or not the locking function is enabled, and releasing a lock if it is determined that the locking function is enabled, the locking function being implemented by a password locking mechanism configured to apply a lock with a password;
 writing a string of data to the recording medium;
 retaining an unexecuted access processing group including access processing left unexecuted when removal of the recording medium is detected during a period in which the string of data is written to the recording medium;
 creating a password;
 supplying the password for enabling the locking function;
 retaining the created password;
 supplying the retained password for releasing the lock if it is determined that the locking function is enabled;
 associating the retained unexecuted access-processing group with the password;
 retaining the associated unexecuted access-processing group and password;
 attempting to release the password lock with the retained password; and
 causing execution of the retained unexecuted access-processing group associated with the password if the password lock is successfully released.

8. The data access method according to claim 7, further including storing the unexecuted access processing in the removable recording medium, thereby allowing a file-system recovery operation in a different data recording system.

9. The data access method according to claim 7, wherein the password is created based on attribute information about the recording medium.

10. The data access method according to claim 7, wherein a plurality of sets of unexecuted access processing groups and passwords are retained, each set including an unexecuted access-processing group and a password that are associated with each other,
 wherein the a password unlocking operation can be performed at least once with at least one retained password.

11. The data access method according to claim 7, further comprising performing a password lock operation after releasing a password lock if a password lock is already applied when a password lock operation is to be performed.

* * * * *